US012726298B2

(12) United States Patent
Si et al.

(10) Patent No.: US 12,726,298 B2
(45) Date of Patent: Sep. 1, 2026

(54) FLEXIBLE RESOURCE ALLOCATION FOR SIDELINK TRANSMISSIONS

(71) Applicant: Samsung Electronics Co., Ltd., Suwon-si (KR)

(72) Inventors: Hongbo Si, Allen, TX (US); Emad Nader Farag, Flanders, NJ (US); Carmela Cozzo, San Diego, CA (US); Kyeongin Jeong, Allen, TX (US); Shiyang Leng, Allen, TX (US); Anil Agiwal, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 61 days.

(21) Appl. No.: 18/677,576

(22) Filed: May 29, 2024

(65) Prior Publication Data

US 2024/0421949 A1 Dec. 19, 2024

Related U.S. Application Data

(60) Provisional application No. 63/524,171, filed on Jun. 29, 2023, provisional application No. 63/521,283, filed on Jun. 15, 2023.

(51) Int. Cl.
*H04L 5/00* (2006.01)
*H04W 72/40* (2023.01)

(52) U.S. Cl.
CPC ........... *H04L 5/0007* (2013.01); *H04W 72/40* (2023.01)

(58) Field of Classification Search
CPC ... H04L 5/0007; H04L 5/0053; H04L 5/0094; H04W 72/40; H04W 72/0446
See application file for complete search history.

(56) References Cited

U.S. PATENT DOCUMENTS 11,825,297 B2 * 11/2023 Li ..................... H04W 72/1263
2020/0280981 A1 * 9/2020 Shin ...................... H04L 5/0092
2020/0351856 A1 * 11/2020 Yeo ....................... H04L 1/0013
2020/0403737 A1 * 12/2020 Yeo ..................... H04W 52/383
2021/0250954 A1 8/2021 Li et al.
2022/0046430 A1 2/2022 Liu et al.
(Continued)

OTHER PUBLICATIONS

International Search Report and Written Opinion issued Sep. 30, 2024 regarding International Application No. PCT/KR2024/008071, 6 pages.

(Continued)

*Primary Examiner* — Ivan O Latorre

(57) ABSTRACT

Apparatuses and methods for flexible resource allocation for sidelink transmissions. A method of a user equipment (UE) in a wireless communication system includes receiving higher layer parameters including a bitmap; determining a first number S>1; and determining a sidelink resource pool based on the bitmap and the first number S, wherein bits in the bitmap indicate whether a group of S consecutive slots are included in the sidelink resource pool. The method further includes determining a second number L; determining L consecutive orthogonal frequency division multiplexing (OFDM) symbols within the S consecutive slots, wherein the L consecutive OFDM symbols are used for a physical sidelink shared channel (PSSCH) or a physical sidelink control channel (PSCCH); and receiving the PSSCH or the PSCCH.

20 Claims, 15 Drawing Sheets

(56) References Cited

U.S. PATENT DOCUMENTS

| | | | | |
|---|---|---|---|---|
| 2022/0272698 | A1* | 8/2022 | Shin | H04L 5/0092 |
| 2023/0124535 | A1 | 4/2023 | Luo et al. | |
| 2023/0284203 | A1* | 9/2023 | Xue | H04W 72/40 370/329 |
| 2023/0308245 | A1* | 9/2023 | Hwang | H04W 72/0446 |
| 2023/0319787 | A1* | 10/2023 | Cozzo | H04L 1/1812 370/329 |
| 2023/0354220 | A1* | 11/2023 | Rastegardoost | H04L 5/001 |
| 2023/0370232 | A1* | 11/2023 | Liu | H04L 1/1854 |
| 2024/0014976 | A1* | 1/2024 | Hamidi-Sepehr | H04L 5/0051 |
| 2024/0048324 | A1* | 2/2024 | Li | H04L 5/0048 |
| 2024/0129936 | A1* | 4/2024 | Ganesan | H04W 72/40 |
| 2024/0421949 | A1* | 12/2024 | Si | H04L 5/0007 |

OTHER PUBLICATIONS

OPPO, “Remaining issues on SL-U PHY channel designs and procedures”, 3GPP TSG RAN WG1 #113, R1-2305422, May 2023, 31 pages.

Spreadtrum Communications, “Discussion on channel access mechanism of sidelink on unlicensed spectrum”, 3GPP TSG RAN WG1 #112b-e, R1-2302601, Apr. 2023, 11 pages.

“3rd Generation Partnership Project; Technical Specification Group Radio Access Network; NR; Physical channels and modulation (Release 16)”, 3GPP TS 38.211 V16.6.0, Jun. 2021, 134 pages.

“3rd Generation Partnership Project; Technical Specification Group Radio Access Network; NR; Multiplexing and channel coding (Release 16)”, 3GPP TS 38.212 V16.6.0, Jun. 2021, 153 pages.

“3rd Generation Partnership Project; Technical Specification Group Radio Access Network; NR; Physical layer procedures for control (Release 16)”, 3GPP TS 38.213 V16.6.0, Jun. 2021, 187 pages.

“3rd Generation Partnership Project; Technical Specification Group Radio Access Network; NR; Physical layer procedures for data (Release 16)”, 3GPP TS 38.214 V16.6.0, Jun. 2021, 172 pages.

“3rd Generation Partnership Project; Technical Specification Group Radio Access Network; NR; Radio Resource Control (RRC) protocol specification (Release 16)”, 3GPP TS 38.331 V16.5.0, Jun. 2021, 964 pages.

Supplementary European Search Report dated Jul. 6, 2026, in connection with European Application No. EP 24823702, 6 pages.

Fujitsu, “Discussion on physical layer structure for NR sidelink,” R1-1905374, 3GPP TSG RAN WG1 #96bis, Xi’an, China, Apr. 8-12, 2019, 11 pages.

* cited by examiner 600
sl-SubchannelSize
sl-TimeResource
slot
sl-NumSubchannel

1700

1800

FLEXIBLE RESOURCE ALLOCATION FOR SIDELINK TRANSMISSIONS

CROSS-REFERENCE TO RELATED AND CLAIM OF PRIORITY

The present application claims priority under 35 U.S.C. § 119 (e) to U.S. Provisional Patent Application No. 63/521,283 filed on Jun. 15, 2023, and U.S. Provisional Patent Application No. 63/524,171 filed on Jun. 29, 2023, which are hereby incorporated by reference in their entirety.

TECHNICAL FIELD

The present disclosure relates generally to wireless communication systems and, more specifically, the present disclosure is related to apparatuses and methods for flexible resource allocation for sidelink (SL) transmissions.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance. To meet the demand for wireless data traffic having increased since deployment of 4G communication systems, and to enable various vertical applications, 5G communication systems have been developed and are currently being deployed.

SUMMARY

The present disclosure relates to flexible resource allocation for SL transmissions.

In one embodiment, a user equipment (UE) in a wireless communication system is provided. The UE includes a transceiver configured to receive higher layer parameters including a bitmap and a processor operably coupled to the transceiver. The processor is configured to determine a first number S>1; determine a sidelink resource pool based on the bitmap and the first number S, wherein bits in the bitmap indicate whether a group of S consecutive slots are included in the sidelink resource pool; determine a second number L; and determine L consecutive orthogonal frequency division multiplexing (OFDM) symbols within the S consecutive slots, wherein the L consecutive OFDM symbols are used for a physical sidelink shared channel (PSSCH) or a physical sidelink control channel (PSCCH). The transceiver is further configured to receive the PSSCH or the PSCCH.

In another embodiment, a method of a UE in a wireless communication system is provided. The method includes receiving higher layer parameters including a bitmap; determining a first number S>1; and determining a sidelink resource pool based on the bitmap and the first number S, wherein bits in the bitmap indicate whether a group of S consecutive slots are included in the sidelink resource pool. The method further includes determining a second number L; determining L consecutive OFDM symbols within the S consecutive slots, wherein the L consecutive OFDM symbols are used for a PSSCH or a PSCCH; and receiving the PSSCH or the PSCCH.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1-20, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, and to enable various vertical applications, 5G/NR communication systems have been developed and are currently being deployed. The 5G/NR communication system is implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation, radio access technology (RAT)-dependent positioning and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

The following documents and standards descriptions are hereby incorporated by reference into the present disclosure as if fully set forth herein: [1] 3GPP TS 38.211 v16.6.0, "NR; Physical channels and modulation;" [2] 3GPP TS 38.212 v16.6.0, "NR; Multiplexing and channel coding;" [3] 3GPP TS 38.213 v16.6.0, "NR; Physical layer procedures for control;" [4] 3GPP TS 38.214 v16.6.0, "NR; Physical layer procedures for data;" and [5] 3GPP TS 38.331 v16.5.0, "NR; Radio Resource Control (RRC) protocol specification."

Figure 1:
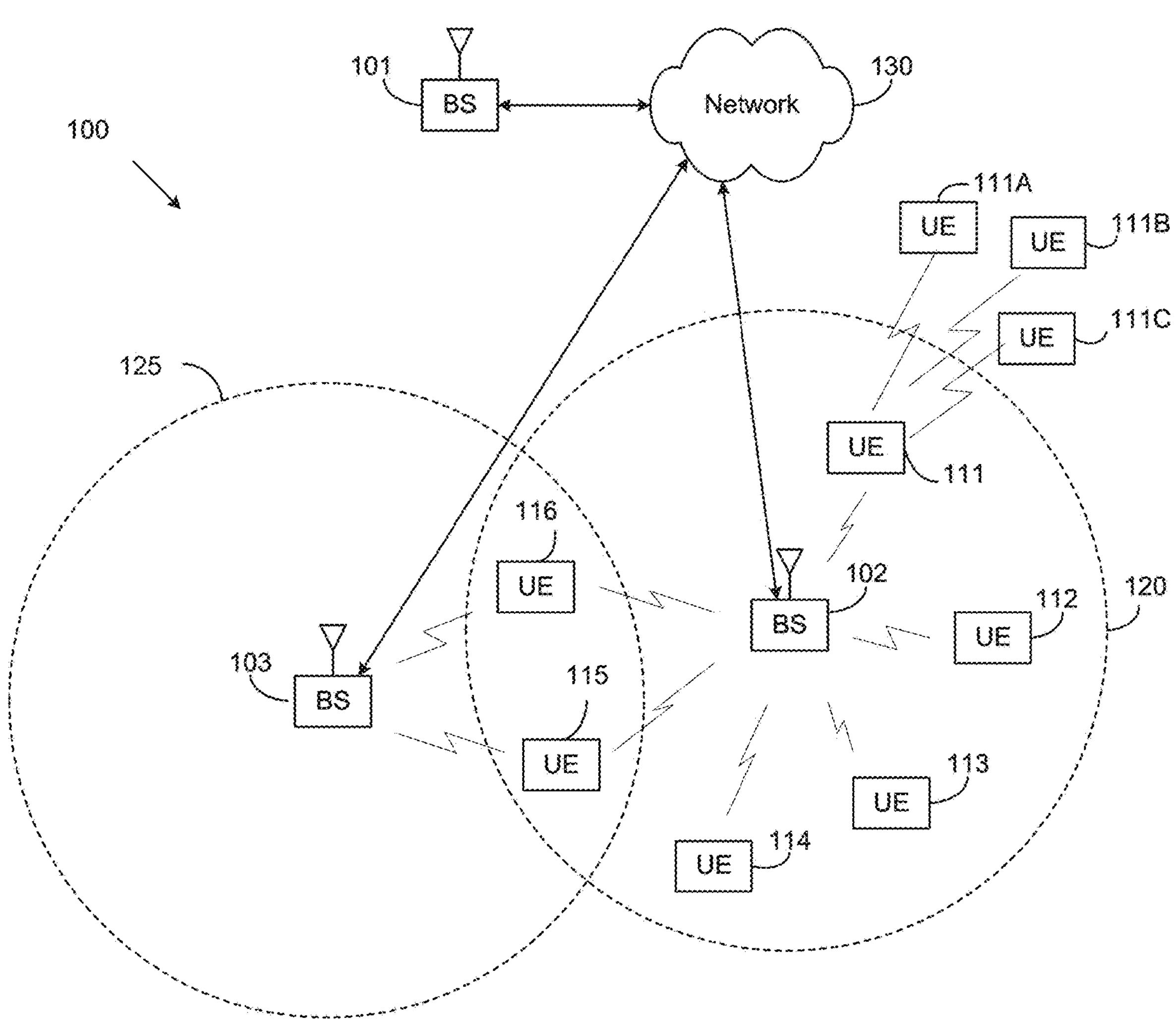
FIG. 1 illustrates an example wireless network according to embodiments of the present disclosure.
Figure 2:
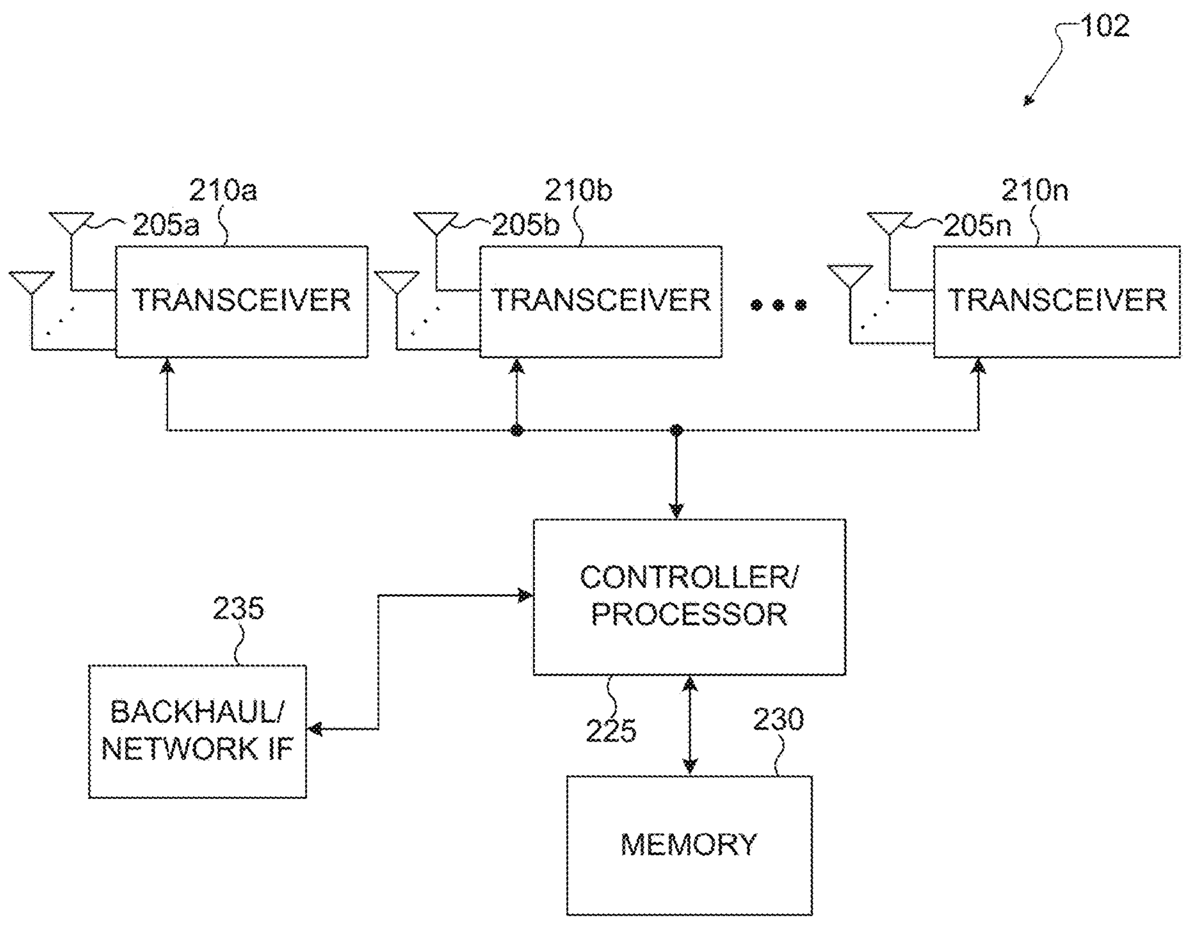
FIG. 2 illustrates an example gNodeB (gNB) according to embodiments of the present disclosure.
Figure 3:
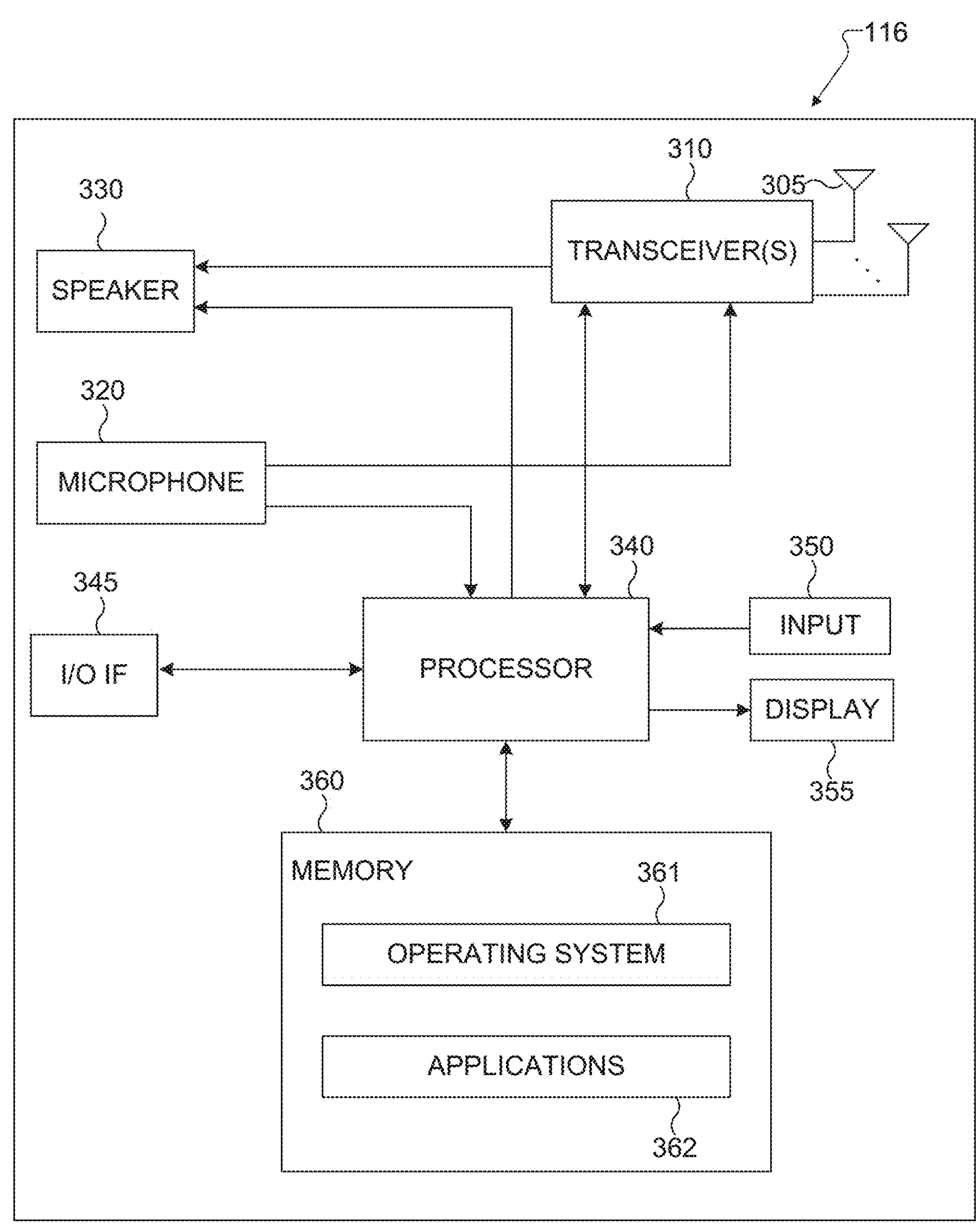
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

In another example, the UE 116 may be within network coverage and the other UE may be outside network coverage (e.g., UEs 111A-111C). In yet another example, both UEs are outside network coverage. In some embodiments, one or more of the gNBs 101-103 may communicate with each other and with the UEs 111-116 using 5G/NR, LTE, LTE-A, WiMAX, WiFi, or other wireless communication techniques. In some embodiments, the UEs 111-116 may use a device to device (D2D) interface called PC5 (e.g., also known as SL at the physical layer) for communication and/or positioning.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for flexible resource allocation for SL transmissions. In certain embodiments, and one or more of the gNBs 101-103 includes circuitry, programing, or a combination thereof, for supporting flexible resource allocation for SL transmissions.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of UL channels and/or signals and the transmission of DL channels and/or signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes for supporting flexible resource allocation for SL transmissions. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100 or by other UEs (e.g., one or more of UEs 111-115) on a SL channel. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channels and/or signals and SL channels and/or signals and the transmission of UL channels and/or signals and SL channels and/or signals by the transceiver(s) 310 in accordance with well-known principles. In some embodiments, the processor 340 includes at least one microprocessor or microcontroller.

The processor 340 is also capable of executing other processes and programs resident in the memory 360, such as processes for flexible resource allocation for SL transmissions.

The processor 340 can move data into or out of the memory 360 as required by an executing process. In some embodiments, the processor 340 is configured to execute the applications 362 based on the OS 361 or in response to signals received from gNBs, another UE, or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355 which includes for example, a touchscreen, keypad, etc., The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4A:
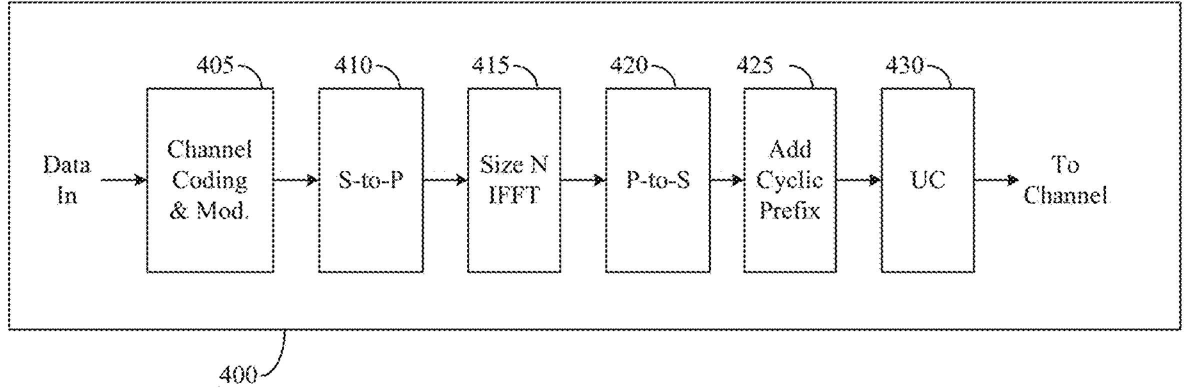
FIGS. 4A and 4B illustrate an example of a wireless transmit and receive paths according to embodiments of the present disclosure.
Figure 4B:
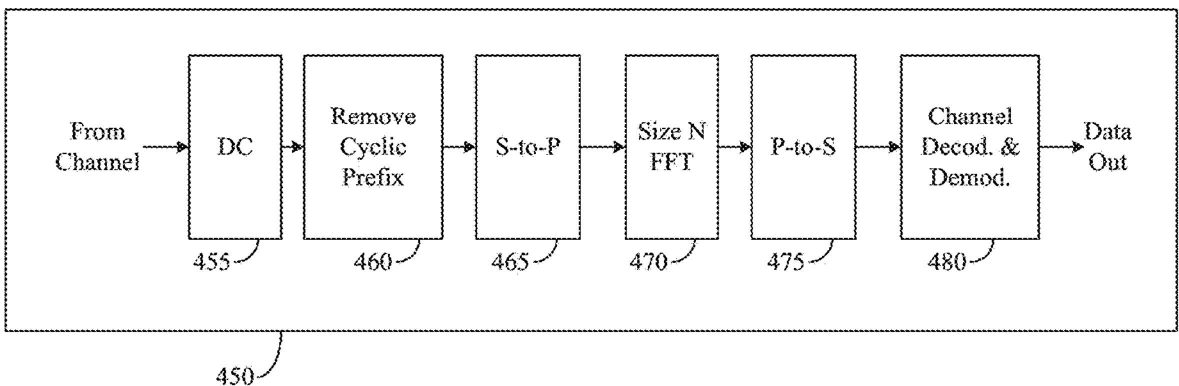

FIG. 4A and FIG. 4B illustrate an example of wireless transmit and receive paths 400 and 450, respectively, according to embodiments of the present disclosure. For example, a transmit path 400 may be described as being implemented in a gNB (such as gNB 102), while a receive path 450 may be described as being implemented in a UE (such as UE 116). However, it will be understood that the receive path 450 can be implemented in a gNB and that the transmit path 400 can be implemented in a UE. In various embodiments, the transmit path 400 may be described as being implemented in a first UE (such as a UE 111) and the receive path 450 may be described as being implemented in a second UE (such as a UE 111A) for communication over a SL or vice versa. It will be understood that the receive path 450 can be implemented in a first UE and that the transmit path 400 can be implemented in a second UE. In some embodiments, the transmit path 400 and/or the receive path 450 is configured for flexible resource allocation for SL transmissions as described in embodiments of the present disclosure.

As illustrated in FIG. 4A, the transmit path 400 includes a channel coding and modulation block 405, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 250 includes a down-converter (DC) 455, a remove cyclic prefix block 460, a S-to-P block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to a RF frequency for transmission via a wireless channel. The signal may also be filtered at a baseband before conversion to the RF frequency.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time-domain signals. The size N FFT block 470 performs an FFT algorithm to generate N parallel frequency-domain signals. The (P-to-S) block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 or for transmitting in the SL to another UE and may implement a receive path 450 for receiving in the downlink from gNBs 101-103 or for receiving in the SL from another UE.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths 400 and 450, respectively, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

Figure 5:
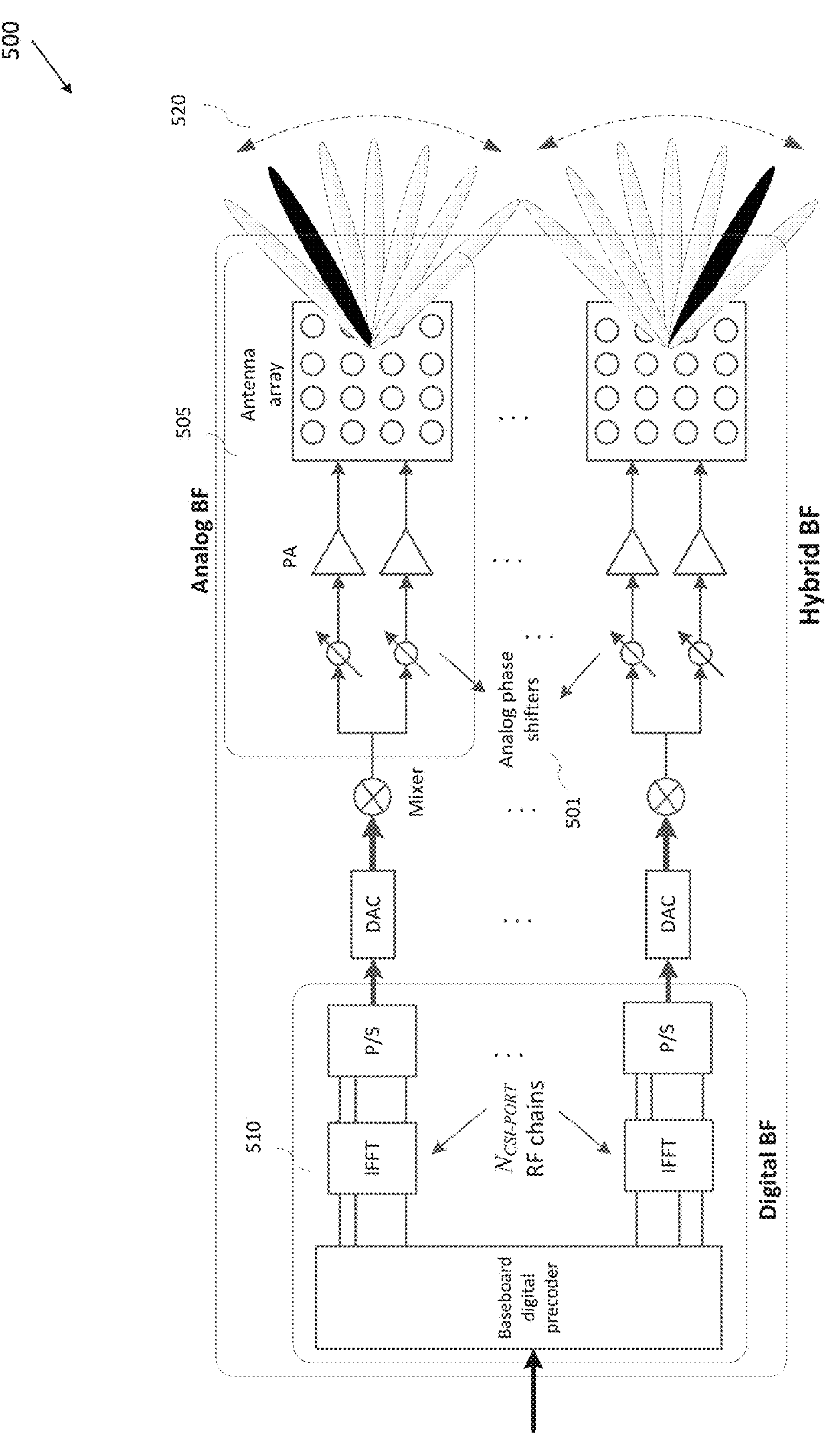
FIG. 5 illustrates an example of a transmitter structure for beamforming according to embodiments of the present disclosure.

FIG. 5 illustrates an example of a transmitter structure 500 for beamforming according to embodiments of the present disclosure. In certain embodiments, one or more of gNB 102 or UE 116 includes the transmitter structure 500. For example, one or more of antennas 205 and its associated systems or antenna 305 and its associated systems can be included in transmitter structure 500. This example is for illustration only and other embodiments can be used without departing from the scope of the present disclosure.

Accordingly, embodiments of the present disclosure recognize that Rel-14 LTE and Rel-15 NR support up to 32 CSI-RS antenna ports which enable an eNB or a gNB to be equipped with a large number of antenna elements (such as 64 or 128). A plurality of antenna elements can then be mapped onto one CSI-RS port. For mmWave bands, although a number of antenna elements can be larger for a given form factor, a number of CSI-RS ports, that can correspond to the number of digitally precoded ports, can be limited due to hardware constraints (such as the feasibility to install a large number of analog-to-digital converters (ADCs)/digital-to-analog converters (DACs) at mmWave frequencies) as illustrated in FIG. 5. Then, one CSI-RS port can be mapped onto a large number of antenna elements that can be controlled by a bank of analog phase shifters 501. One CSI-RS port can then correspond to one sub-array which produces a narrow analog beam through analog beamforming 505. This analog beam can be configured to sweep across a wider range of angles 520 by varying the phase shifter bank across symbols or slots/subframes. The number of sub-arrays (equal to the number of RF chains) is the same as the number of CSI-RS ports $N_{CSI\text{-}PORT}$. A digital beamforming unit 510 performs a linear combination across $N_{CSI\text{-}PORT}$ analog beams to further increase a precoding gain. While analog beams are wideband (hence not frequency-selective), digital precoding can be varied across frequency sub-bands or resource blocks. Receiver operation can be conceived analogously.

Since the transmitter structure 500 of FIG. 5 utilizes multiple analog beams for transmission and reception (wherein one or a small number of analog beams are selected out of a large number, for instance, after a training duration that is occasionally or periodically performed), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting", respectively), and receiving a DL or UL transmission via a selection of a corresponding RX beam. The system of FIG. 5 is also applicable to higher frequency bands such as >52.6 GHz. In this case, the system can employ only analog beams. Due to the O2 absorption loss around 60 GHz frequency (~10 dB additional loss per 100 m distance), a larger number and narrower analog beams (hence a larger number of radiators in the array) are needed to compensate for the additional path loss.

The text and figures are provided solely as examples to aid the reader in understanding the present disclosure. They are not intended and are not to be construed as limiting the scope of the present disclosure in any manner. Although certain embodiments and examples have been provided, it will be apparent to those skilled in the art based on the disclosures herein that changes in the embodiments and examples shown may be made without departing from the scope of the present disclosure. The transmitter structure 500 for beamforming is for illustration only and other embodiments can be used without departing from the scope of the present disclosure.

The flowcharts herein illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

A description of example embodiments is provided on the following pages.

Any of the variation embodiments can be utilized independently or in combination with at least one other variation embodiment.

Figure 6:
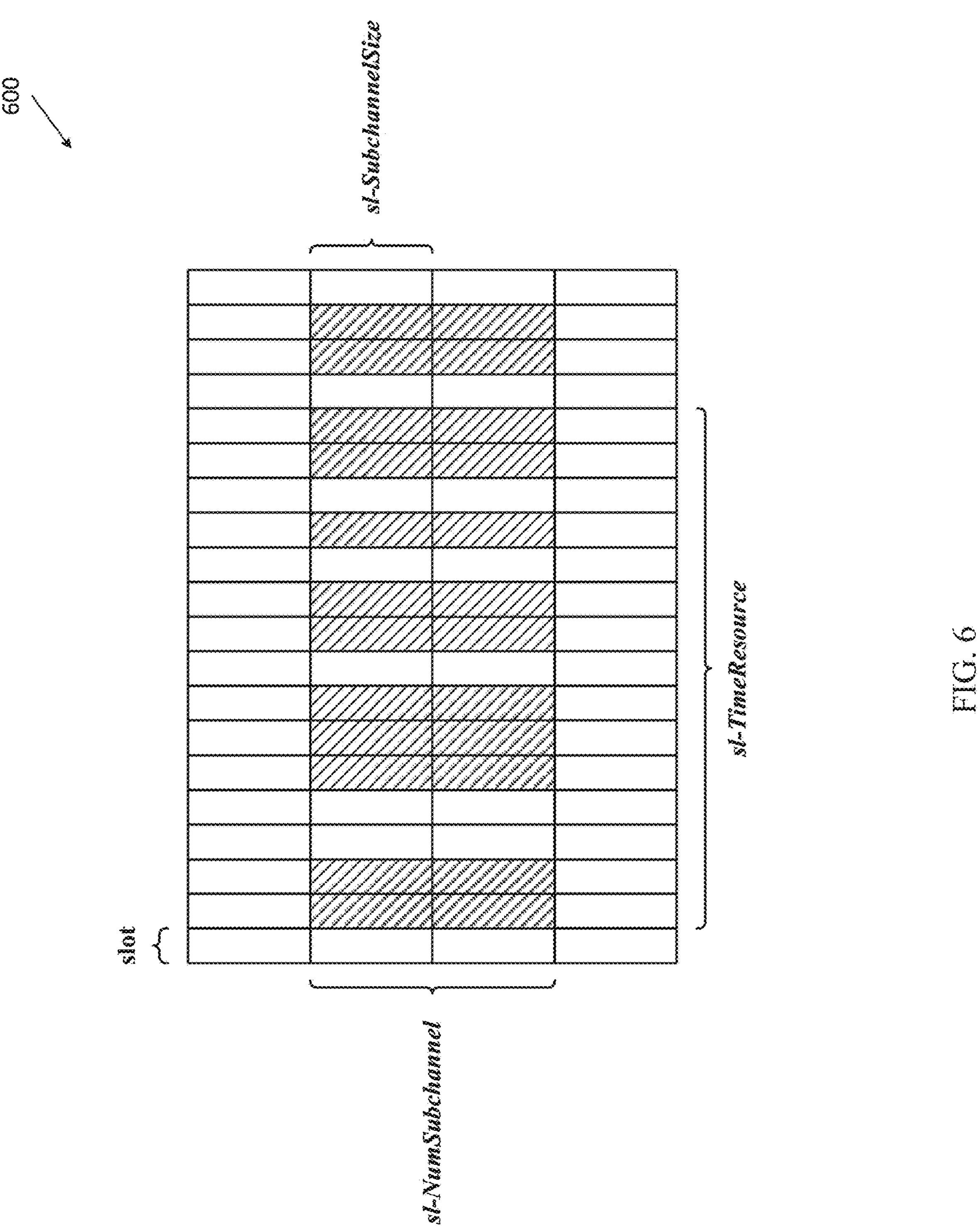
FIG. 6 illustrates a diagram of an example resource pool according to embodiments of the present disclosure.

FIG. 6 illustrates a diagram of an example resource pool 600 according to embodiments of the present disclosure. For example, resource pool 600 can be accessed by any of the UEs 111-116 of FIG. 1. This example is for illustration only and other embodiments can be used without departing from the scope of the present disclosure.

In Rel-16 NR V2X, transmission and reception of SL signals and channels are based on resource pool(s) confined in the configured SL bandwidth part (BWP). In the frequency domain, a resource pool includes a (pre-)configured number (e.g., sl-NumSubchannel) of contiguous sub-channels, wherein each sub-channel includes a set of contiguous resource blocks (RBs) in a slot with size (pre-)configured by higher layer parameter (e.g., sl-SubchannelSize). In time domain, slots in a resource pool occur with a periodicity of 10240 ms, and slots including S-SSB, non-UL slots, and reserved slots are not applicable for a resource pool. The set of slots for a resource pool is further determined within the remaining slots, based on a (pre-)configured bitmap (e.g., sl-TimeResource). With reference to FIG. 6, an illustration of a resource pool is shown.

Figure 7:
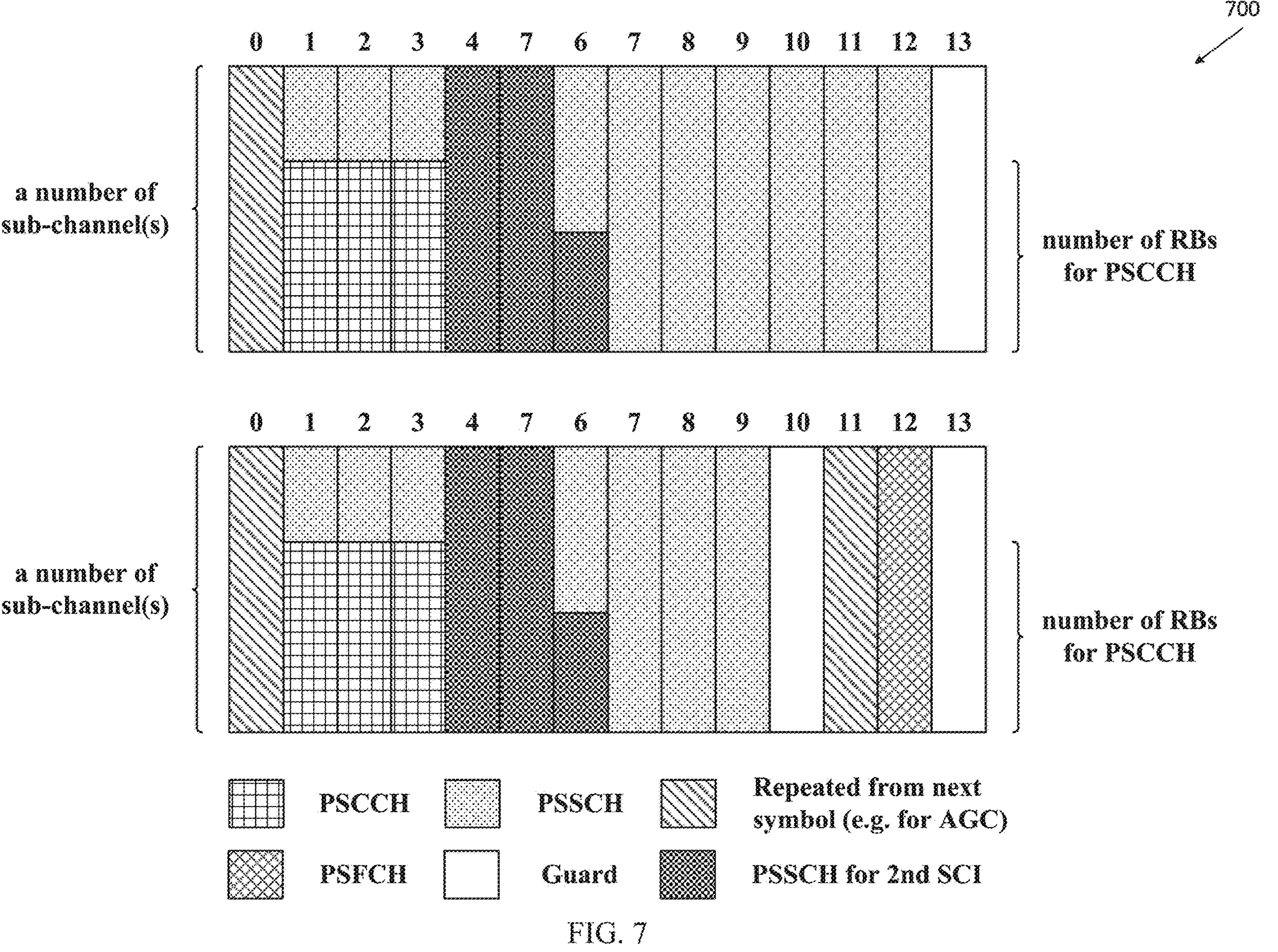
FIG. 7 illustrates diagrams of example slot structures according to embodiments of the present disclosure.

FIG. 7 illustrates diagrams of example slot structures 700 according to embodiments of the present disclosure. For example, slot structures 700 can be utilized by the UE 116 of FIG. 3. This example is for illustration only and other embodiments can be used without departing from the scope of the present disclosure.

Transmission and reception of PSSCH, PSCCH, and physical sidelink feedback channel (PSFCH) are confined within and associated with a resource pool, with parameters (pre-) configured by higher layers (e.g., SL-PSSCH-Config, SL-PSCCH-Config, and SL-PSFCH-Config, respectively).

A UE transmits the PSSCH in consecutive symbols within a slot of the resource pool. PSSCH resource allocation starts from the second symbol configured for SL, e.g., startSLsymbol+1. The first symbol configured for SL is duplicated from the second configured for SL, for automatic gain control (AGC) purpose. The UE (e.g., the UE 111) does not transmit PSSCH in symbols not configured for SL, or in symbols configured for PSFCH, or in the last symbol configured for SL, or in the symbol immediately preceding the PSFCH. The frequency domain resource allocation unit for PSSCH is the sub-channel, and the sub-channel assignment is determined using the corresponding field in the associated SL control information (SCI).

For transmitting a PSCCH, the UE can be provided a number of symbols (either 2 symbols or 3 symbols) in a resource pool (e.g., sl-TimeResourcePSCCH) starting from the second symbol configured for SL, e.g., startSLsymbol+1; and further provided a number of RBs in the resource pool (e.g., sl-FreqResourcePSCCH) starting from the lowest RB of the lowest sub-channel of the associated PSSCH.

The UE can be further provided a number of slots (e.g., sl-PSFCH-Period) in the resource pool for a period of PSFCH transmission occasion resources. A slot in the resource pool is determined as containing a PSFCH transmission occasion if the relative slot index within the resource pool is an integer multiple of the period of PSFCH transmission occasion. PSFCH is transmitted in two contiguous symbols in a slot, wherein the second symbol is with index startSLsymbols+lengthSLsymbols−2, and the two symbols are repeated. In frequency domain, PSFCH is transmitted in a single RB, wherein OCC can be applied within the RB for multiplexing, and the location of the RB is determined based on an indication of a bitmap (e.g., sl-PSFCH-RB-Set), and the selection of PSFCH resource is according to the source ID and destination ID.

The first symbol including PSSCH and PSCCH is duplicated for AGC purpose. With reference to FIG. 7, an illustration of the slot structure including PSSCH and PSCCH is shown; the slot structure including PSSCH, PSCCH and PSFCH is shown.

For SL operating on a higher frequency range (e.g., FR2-2 with 52.6 to 71 GHz), embodiments of the present disclosure recognize there is a need to support a large subcarrier spacing for SL transmissions, such as at least one from 120 kHz, 240 kHz, 480 kHz, or 960 kHz. For this case, the slot format for supporting SL transmissions and the corresponding AGC issue needs to be enhanced.

The embodiments and examples in this disclosure can be applied to small subcarrier spacing (e.g., 15 kHz, 30 kHz, 60 kHz) as well, although motivated by large subcarrier spacing.

This disclosure includes embodiments for supporting flexible resource allocation for SL transmissions. More precisely, the following components are provided in this disclosure.

Flexible slot format for SL transmission

Flexible resource pool

Mapping for AGC symbols

Example UE procedure

In one embodiment, the resource allocation for SL transmission(s) (e.g., at least for PSSCH/PSCCH) can be based on a flexible slot structure and/or a flexible unit for determining a resource pool.

Figure 8:
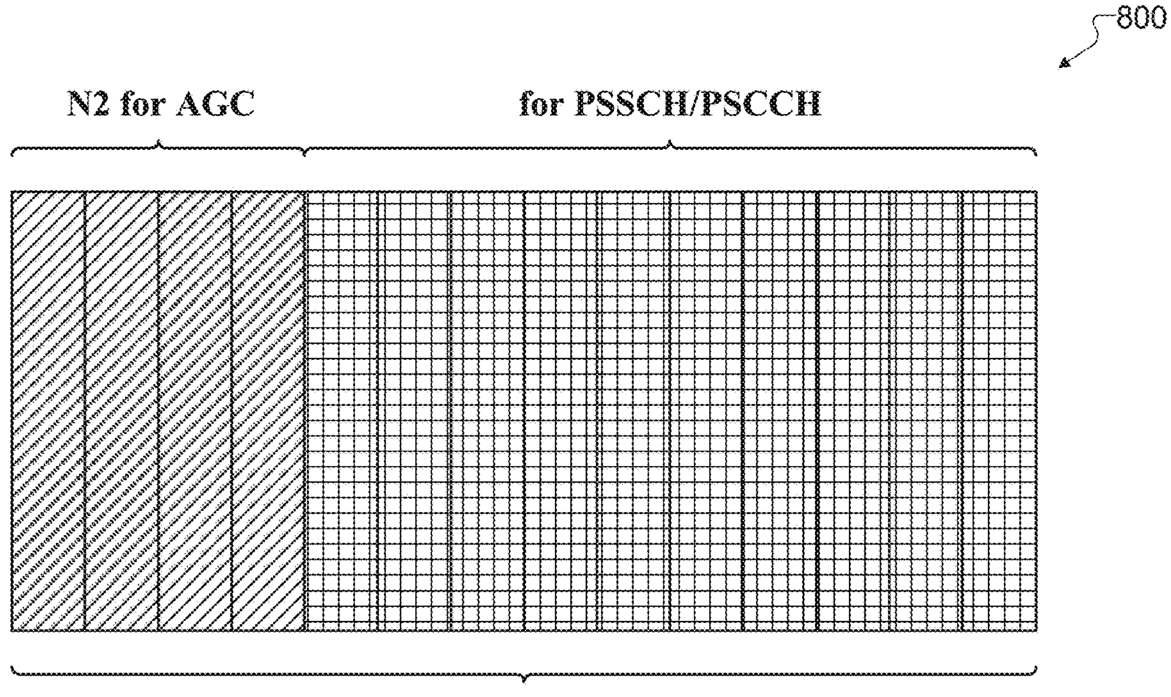
FIG. 8 illustrates a diagram of an example resource allocation according to embodiments of the present disclosure.

FIG. 8 illustrates a diagram of an example resource allocation 800 according to embodiments of the present disclosure. For example, resource allocation 800 can be received by the UE 111A of FIG. 1. This example is for illustration only and other embodiments can be used without departing from the scope of the present disclosure.

In a first example, the resource allocation for SL transmission(s) (e.g., at least for PSSCH/PSCCH) can be based on a number N1 of OFDM symbols, and the first N2 number of OFDM symbols within the N1 OFDM symbols can be repeated based on an example of this disclosure, e.g., used for AGC purpose. With reference to FIG. 8, an illustration of this example is shown.

Figure 9:
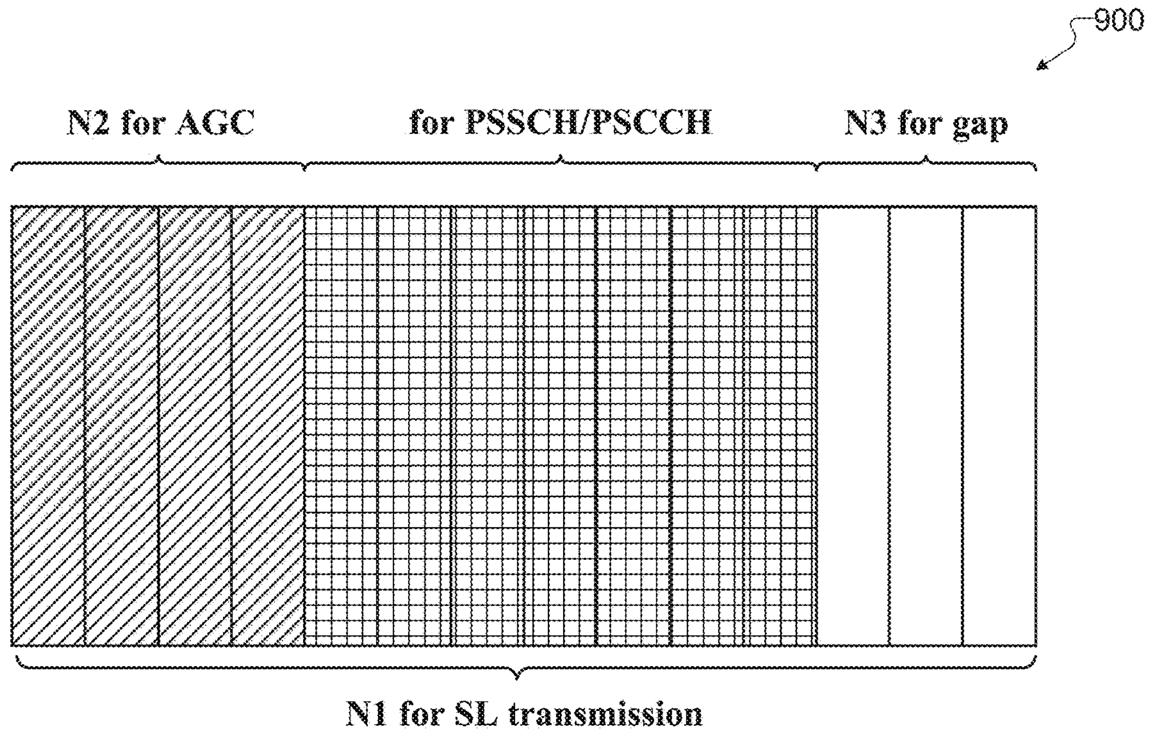
FIG. 9 illustrates a diagram of an example resource allocation according to embodiments of the present disclosure.

FIG. 9 illustrates a diagram of an example resource 900 allocation according to embodiments of the present disclosure. For example, resource allocation 900 can be received by the UE 111B of FIG. 1. This example is for illustration only and other embodiments can be used without departing from the scope of the present disclosure.

In a second example, the resource allocation for SL transmission(s) (e.g., at least for PSSCH/PSCCH) can be based on a number N1 of OFDM symbols, wherein the first N2 number of OFDM symbols within the N1 OFDM symbols can be repeated based on an example of this disclosure, e.g., used for AGC purpose, and the last N3 number of OFDM symbols within the N1 OFDM symbols can be used for gap (e.g., reserved without any SL transmission(s)/reception(s)). With reference to FIG. 9, an illustration of this example is shown.

Figure 10:
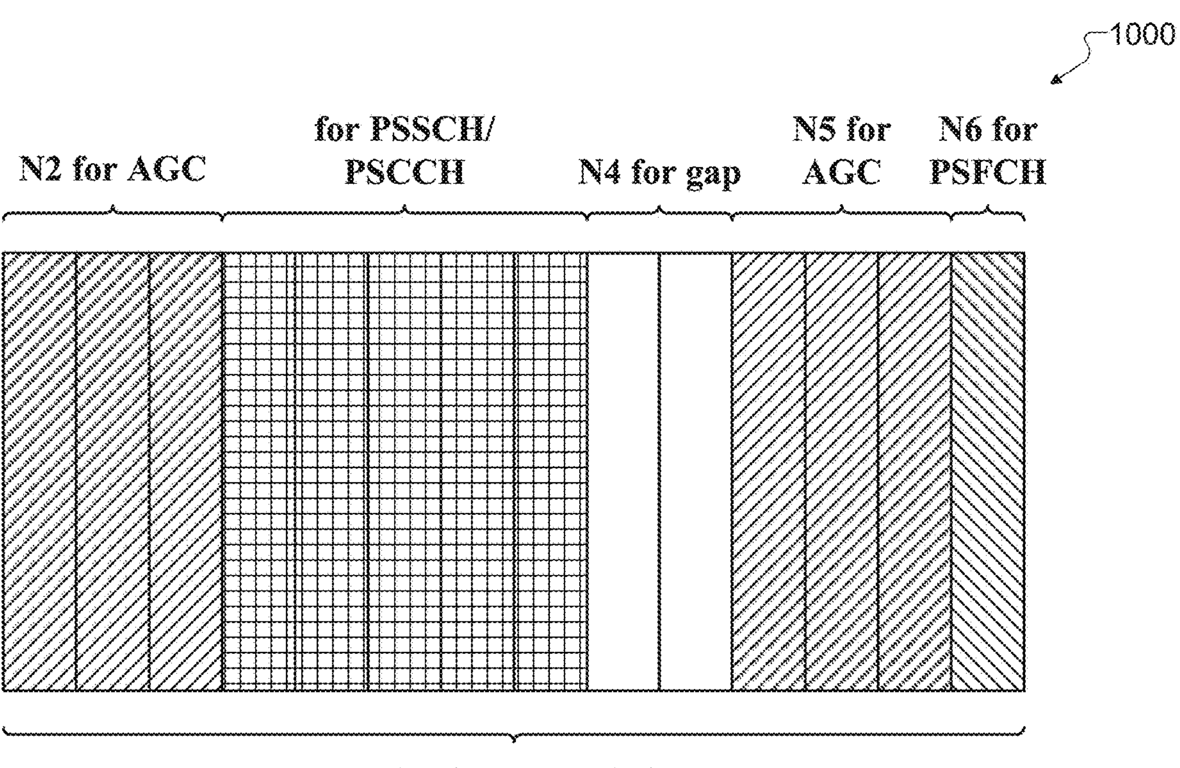
FIG. 10 illustrates a diagram of an example resource allocation according to embodiments of the present disclosure.

FIG. 10 illustrates a diagram of an example resource allocation 1000 according to embodiments of the present disclosure. For example, resource allocation 1000 can be received by the UE 111C of FIG. 1. This example is for illustration only and other embodiments can be used without departing from the scope of the present disclosure.

In a third example, the resource allocation for SL transmission(s) (e.g., at least for PSSCH/PSCCH and PSFCH) can be based on a number N1 of OFDM symbols, wherein the first N2 number of OFDM symbols within the N1 OFDM symbols can be repeated based on an example of this disclosure, e.g., used for AGC purpose, the last N6 number of OFDM symbols within the N1 OFDM symbols can be used for PSFCH transmission, the N5 number of OFDM symbols before PSFCH transmission are repeated based on an example of this disclosure, e.g., used for AGC purpose, and a number N4 of OFDM symbols for gap (e.g., reserved without any SL transmission(s)/reception(s)). With reference to FIG. 10, an illustration of this example is shown.

Figure 11:
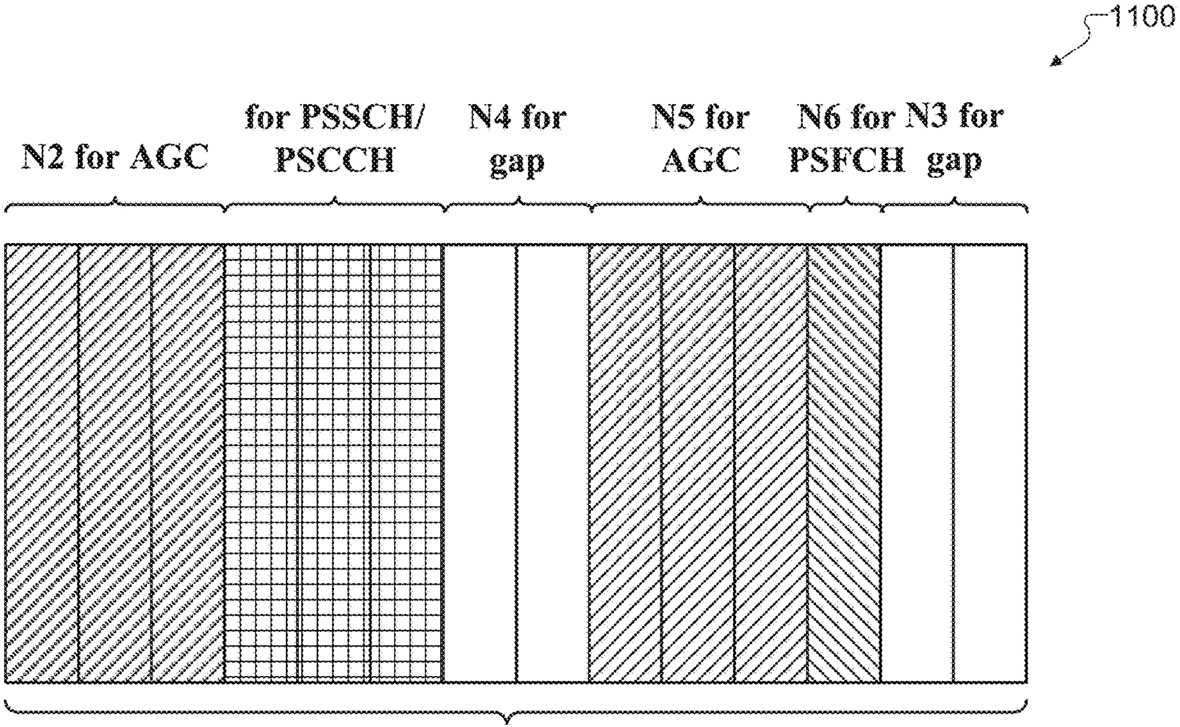
FIG. 11 illustrates a diagram of an example resource allocation according to embodiments of the present disclosure.

FIG. 11 illustrates a diagram of an example resource allocation 1100 according to embodiments of the present disclosure. For example, resource allocation 1100 can be received by the UE 111 of FIG. 1. This example is for illustration only and other embodiments can be used without departing from the scope of the present disclosure.

In a fourth example, the resource allocation for SL transmission(s) (e.g., at least for PSSCH/PSCCH and PSFCH) can be based on a number N1 of OFDM symbols, wherein the first N2 number of OFDM symbols within the N1 OFDM symbols can be repeated based on an example of this disclosure, e.g., used for AGC purpose, the last N6 number of OFDM symbols within the N1 OFDM symbols can be used for PSFCH transmission, the N5 number of OFDM symbols before PSFCH transmission are repeated based on an example of this disclosure, e.g., used for AGC purpose, and a number N4 of OFDM symbols for gap (e.g., reserved without any SL transmission(s)/reception(s)). With reference to FIG. 11, an illustration of this example is shown.

The following examples on N1, N2, N3, N4, N5, or N6, whenever applicable, can be combined with the one or more examples described herein on the resource allocation for SL transmissions.

In one example, there is a further restriction that N1 is an integer multiple of 14, e.g., for normal CP case, which is equivalent to the basis for resource allocation as S1=N1/14 slots. In another example, N1 is a number of consecutive symbols for SL transmission within S1 slots, e.g., N1≤S1*14.

In one example, the value of N1 and/or S1 can be (pre-)configured.

In another example, the value of N1 and/or S1 can be determined based on the subcarrier spacing (SCS) of the OFDM symbols for SL transmissions.

In yet another example, the value of N1 can be scaled based on a ratio of a subcarrier spacing of the OFDM symbol to a reference subcarrier spacing. For instance, N1 can be determined as N1=R*N1', wherein R=SCS_SL/SCS_ref, and SCS_SL is the SCS of the OFDM symbols for SL transmissions, and SCS_ref is the reference SCS. For one sub-instance, SCS_ref=120 kHz (e.g., then R=2 for SCS_SL=240 kHz; R=4 for SCS_SL=480 kHz). For another sub-instance, N1' can be (pre-)configured.

In yet another example, the value of S1 can be scaled based on a ratio of a subcarrier spacing of the OFDM symbol to a reference subcarrier spacing. For instance, S1 can be determined as S1=R*S1', wherein R=SCS_SL/SCS_ref, and SCS_SL is the SCS of the OFDM symbols for SL transmissions, and SCS_ref is the reference SCS. For one sub-instance, SCS_ref=120 kHz (e.g., then R=2 for SCS_SL-240 kHz; R=4 for SCS_SL=480 kHz). For another sub-instance, S1' can be (pre-)configured. For yet another sub-instance, S1'=1.

In yet another example, the value of N1 can be based on the subcarrier spacing of the OFDM symbol. For instance, N1 can be determined as N1=R*N1', wherein R is based on the SCS of the OFDM symbol, and N1' is common for the SCSs. For one sub-instance, R can be pre-determined based on the SCS, e.g., R=SCS_SL/SCS_ref, and SCS_SL is the SCS of the OFDM symbols for SL transmissions, and SCS_ref is the reference SCS (e.g., SCS_ref=120 kHz, then R=2 for SCS_SL=240 kHz; R=4 for SCS_SL=480 kHz). For another sub-instance, R can be (pre-)configured. For yet another sub-instance, N1' can be (pre-)configured.

In yet another example, the value of S1 can be based on the subcarrier spacing of the OFDM symbol. For instance, S1 can be determined as S1=R*S1', wherein R is based on the SCS of the OFDM symbol, and S1' is common for the SCSs. For one sub-instance, R can be pre-determined based on the SCS, e.g., R=SCS_SL/SCS_ref, and SCS_SL is the SCS of the OFDM symbols for SL transmissions, and SCS_ref is the reference SCS (e.g., SCS_ref=120 kHz, then R=2 for SCS_SL=240 kHz; R=4 for SCS_SL=480 kHz). For another sub-instance, R can be (pre-)configured. For yet another sub-instance, S1' can be (pre-)configured. For yet another sub-instance, S1'=1.

In one example, the first symbol of the N1 OFDM symbols is aligned with a first symbol of a slot.

In another example, the first symbol of the N1 OFDM symbols has an offset to the start of a slot, wherein the offset is denoted as O. In one instance, O can be (pre-)configured.

In one example, the value of N2 can be fixed in the specification.

In another example, the value of N2 can be (pre-)configured.

In yet another example, the value of N2 can be determined based on the subcarrier spacing of the OFDM symbol. For instance, N2 can be determined as N2=R*N2', wherein R is based on the SCS of the OFDM symbol, and N2' is common for the SCSs. For one sub-instance, R can be pre-determined based on the SCS, e.g., R=SCS_SL/SCS_ref, and SCS_SL is the SCS of the OFDM symbols for SL transmissions, and SCS_ref is the reference SCS (e.g., SCS_ref=120 kHz, then R=2 for SCS_SL=240 kHz; R=4 for SCS_SL=480 kHz). For another sub-instance, R can be (pre-)configured. For yet another sub-instance, N2' can be (pre-)configured. For yet another sub-instance, N2' can be fixed in the specification, e.g., N2'=1.

In yet another example, the value of N2 can be based on a UE capability.

In yet another example, the maximum value of N2 can be based on a UE capability.

In one example, the value of N3 can be fixed in the specification.

In another example, the value of N3 can be (pre-)configured.

In yet another example, the value of N3 can be determined based on the subcarrier spacing of the OFDM symbol. For instance, N3 can be determined as N3=R*N3', wherein R is based on the SCS of the OFDM symbol, and N3' is common for the SCSs. For one sub-instance, R can be pre-determined based on the SCS, e.g., R=SCS_SL/SCS_ref, and SCS_SL is the SCS of the OFDM symbols for SL transmissions, and SCS_ref is the reference SCS (e.g., SCS_ref=120 kHz, then R=2 for SCS_SL=240 kHz; R=4 for SCS_SL=480 kHz). For another sub-instance, R can be (pre-)configured. For yet another sub-instance, N3' can be (pre-)configured. For yet another sub-instance, N3' can be fixed in the specification, e.g., N3'=1.

In yet another example, the value of N3 can be based on a UE capability.

In yet another example, the maximum value of N3 can be based on a UE capability.

In yet another example, the value of N1-N3 can be (pre-)configured.

In one example, the value of N4 can be fixed in the specification.

In another example, the value of N4 can be (pre-)configured.

In yet another example, the value of N4 can be determined based on the subcarrier spacing of the OFDM symbol. For instance, N4 can be determined as N4=R*N4', wherein R is based on the SCS of the OFDM symbol, and N4' is common for the SCSs. For one sub-instance, R can be pre-determined based on the SCS, e.g., R=SCS_SL/SCS_ref, and SCS_SL is the SCS of the OFDM symbols for SL transmissions, and SCS_ref is the reference SCS (e.g., SCS_ref=120 kHz, then R=2 for SCS_SL=240 kHz; R=4 for SCS_SL=480 kHz). For another sub-instance, R can be (pre-)configured. For yet another sub-instance, N4' can be (pre-)configured. For yet another sub-instance, N4' can be fixed in the specification, e.g., N4'=1.

In yet another example, the value of N4 can be based on a UE capability.

In yet another example, the maximum value of N4 can be based on a UE capability.

In yet another example, the value of N3 is same as the value of N4, e.g., N3=N4.

In one example, the value of N5 can be fixed in the specification.

In another example, the value of N5 can be (pre-)configured.

In yet another example, the value of N5 can be determined based on the subcarrier spacing of the OFDM symbol. For instance, N5 can be determined as N5=R*N5', wherein R is based on the SCS of the OFDM symbol, and N5' is common for the SCSs. For one sub-instance, R can be pre-determined based on the SCS, e.g., R=SCS_SL/SCS_ref, and SCS_SL is the SCS of the OFDM symbols for SL transmissions, and SCS_ref is the reference SCS (e.g., SCS_ref=120 kHz, then R=2 for SCS_SL=240 kHz; R=4 for SCS_SL=480 kHz). For another sub-instance, R can be (pre-)configured. For yet another sub-instance, N5' can be (pre-)configured. For yet another sub-instance, N5' can be fixed in the specification, e.g., N5'=1.

In yet another example, the value of N5 can be based on a UE capability.

In yet another example, the maximum value of N5 can be based on a UE capability.

In yet another example, the value of N5 is same as the value of N2, e.g., N5=N2.

In one example, the value of N6 can be fixed in the specification, e.g., N6=1.

In another example, the value of N6 can be (pre-)configured.

In yet another example, the value of N6 can be determined based on the subcarrier spacing of the OFDM symbol. For instance, N6 can be determined as N6=R*N6', wherein R is based on the SCS of the OFDM symbol, and N5' is common for the SCSs. For one sub-instance, R can be pre-determined based on the SCS, e.g., R=SCS_SL/SCS_ref, and SCS_SL is the SCS of the OFDM symbols for SL transmissions, and SCS_ref is the reference SCS (e.g., SCS_ref=120 kHz, then R=2 for SCS_SL=240 kHz; R=4 for SCS_SL=480 kHz). For another sub-instance, R can be (pre-)configured. For yet another sub-instance, N6' can be (pre-)configured. For yet another sub-instance, N6' can be fixed in the specification, e.g., N6'=1.

In yet another example, the value of N6 can be based on a UE capability.

In yet another example, the maximum value of N6 can be based on a UE capability.

In one embodiment, the SL resource pool can be determined based on a time domain unit of N1 OFDM symbols or S1 slots, wherein N1 or S1 can be according to example in this disclosure.

For example, each bit in the bitmap for determining the time domain resource for a resource pool corresponds to N1 OFDM symbols or S1 slots (e.g., which are consecutive).

For another example, when the unit is S1 slots, the reserved slots can be based on equation $N_{reserved}=(10240\times 2^{\mu}-N_{S\text{-}SSB}-N_{nonSL}) \bmod (L_{bitmap}\times S_1)$.

Figure 12:
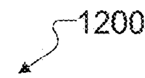
FIG. 12 illustrates a diagram of example orthogonal frequency division multiplexing (OFDM) symbols according to embodiments of the present disclosure.
Figure 12:
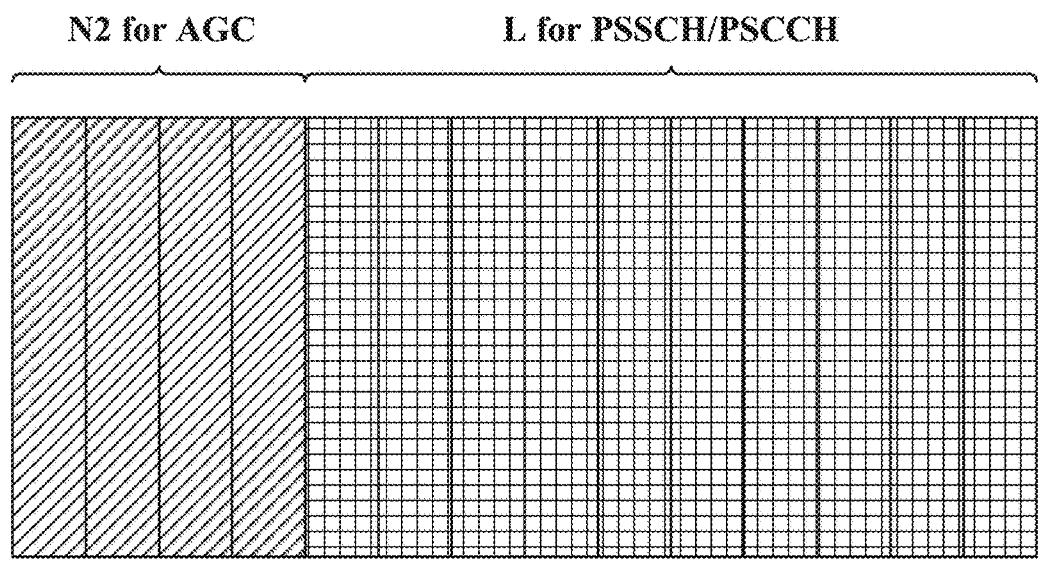

FIG. 12 illustrates a diagram of example OFDM symbols 1200 according to embodiments of the present disclosure. For example, OFDM symbols 1200 can be received by any of the UEs 111-116 of FIG. 1. This example is for illustration only and other embodiments can be used without departing from the scope of the present disclosure.

In one embodiment, the N2 OFDM symbols for AGC purpose are repeated from the remaining OFDM symbols in the N1 OFDM symbols which are available for PSSCH and/or PSCCH transmissions. Denote the number of remaining OFDM symbols in the N1 OFDM symbols which are available for PSSCH and/or PSCCH transmissions as L, wherein for example, the symbols for a gap, or PSFCH are excluded from the N1 OFDM symbols. With reference to FIG. 12, an illustration of this embodiment is shown.

For one example, every OFDM symbol in the N2 OFDM symbols for AGC is repeated from the first OFDM symbol in the L OFDM symbols.

For another example, the N2 OFDM symbols for AGC are repeated from the first N2 OFDM symbols within the L OFDM symbols, e.g., the i-th OFDM symbol within the N2 OFDM symbols for AGC is repeated from the i-th OFDM symbol within the L OFDM symbols, wherein $1 \le i \le N2$. For instance, this example can be applicable when $L \ge N2$.

For yet another example, the N2 OFDM symbols for AGC are repeated from part or each of the L OFDM symbols, e.g., the i-th OFDM symbol within the N2 OFDM symbols for AGC is repeated from the (i mod L)-th OFDM symbol within the L OFDM symbols, when i is not an integer multiple of L; and repeated from the L-th OFDM symbol within the L OFDM symbols, when i is an integer multiple of L, wherein $1 \le i \le N2$. For instance, this example can be applicable when $L \le N2$.

For yet another example, the N2 OFDM symbols for AGC are repeated from the first K1 OFDM symbols within the L OFDM symbols, e.g., the i-th OFDM symbol within the N2 OFDM symbols for AGC is repeated from the (i mod K1)-th OFDM symbol within the L OFDM symbols, when i is not an integer multiple of K1; and repeated from the K1-th OFDM symbol within the L OFDM symbols, when i is an integer multiple of K1, wherein $1 \le i \le N2$. For one instance, K1=N2. For another instance, K1=L. For yet another instance, K1 can be a fixed value in the specification, e.g., K1=1 or K1=2. For yet another instance, K1 can be (pre-) configured.

In another embodiment, the N5 OFDM symbols for AGC purpose are repeated from the N6 OFDM symbols for PSFCH transmissions. With reference to FIG. 12, an illustration of this embodiment is shown.

Figure 13:
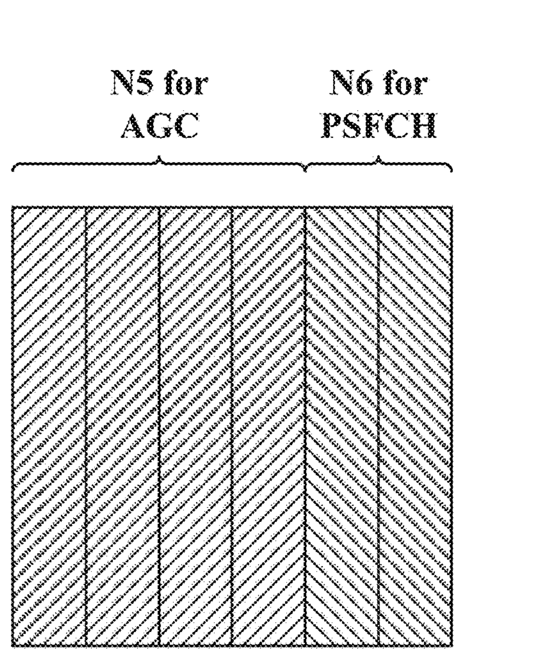
FIG. 13 illustrates a diagram of example OFDM symbols according to embodiments of the present disclosure.

FIG. 13 illustrates a diagram of example OFDM symbols 1300 according to embodiments of the present disclosure. For example, OFDM symbols 1300 can be received by the UE 111A of FIG. 1. This example is for illustration only and other embodiments can be used without departing from the scope of the present disclosure.

For one example, every OFDM symbol in the N5 OFDM symbols for AGC is repeated from the first OFDM symbol in the N6 OFDM symbols.

For another example, the N5 OFDM symbols for AGC are repeated from the first N5 OFDM symbols within the N6 OFDM symbols, e.g., the i-th OFDM symbol within the N5 OFDM symbols for AGC is repeated from the i-th OFDM symbol within the N6 OFDM symbols, wherein $1 \le i \le N5$. For instance, this example can be applicable when $N6 \ge N5$.

For yet another example, the N5 OFDM symbols for AGC are repeated from part or each of the N6 OFDM symbols, e.g., the i-th OFDM symbol within the N5 OFDM symbols for AGC is repeated from the (i mod N6)-th OFDM symbol within the N6 OFDM symbols, when i is not an integer multiple of N6; and repeated from the N6-th OFDM symbol within the N6 OFDM symbols, when i is an integer multiple of N6, wherein $1 \le i \le N5$. For instance, this example can be applicable when $N6 \le N5$.

For yet another example, the N5 OFDM symbols for AGC are repeated from the first K2 OFDM symbols within the N6 OFDM symbols, e.g., the i-th OFDM symbol within the N5 OFDM symbols for AGC is repeated from the (i mod K2)-th OFDM symbol within the N6 OFDM symbols, when i is not an integer multiple of K2; and repeated from the K2-th OFDM symbol within the N6 OFDM symbols, when i is an integer multiple of K2, wherein $1 \le i \le N5$. For one instance, K2=N5. For another instance, K2=N6. For yet another instance, K2 can be a fixed value in the specification, e.g., K2=1 or K2=2. For yet another instance, K2 can be (pre-) configured.

Figure 14:
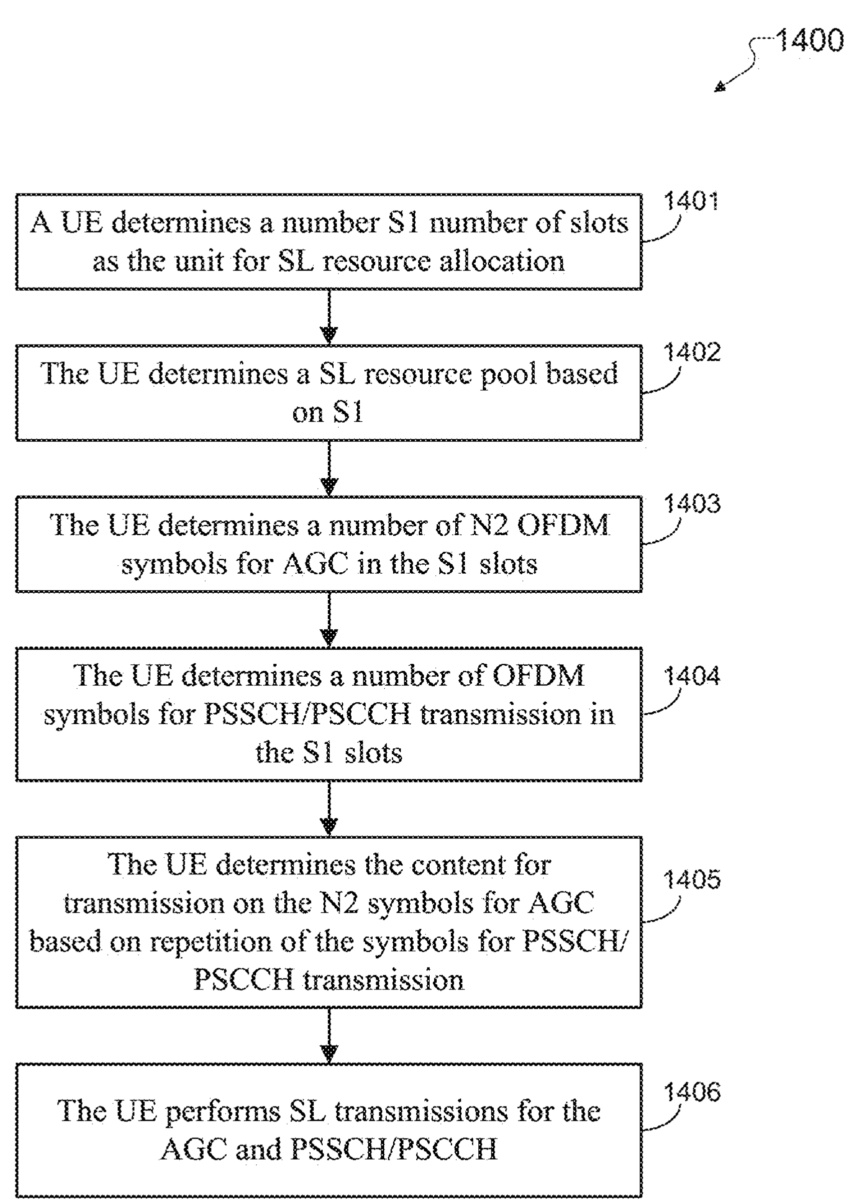
FIG. 14 illustrates a flowchart of an example UE procedure for resource allocation for SL transmission according to embodiments of the present disclosure.

FIG. 14 illustrates a flowchart of an example UE procedure 1400 for resource allocation for SL transmission according to embodiments of the present disclosure. For example, UE procedure 1400 for resource allocation for SL transmission can be performed by the UE 111 of FIG. 1. This example is for illustration only and other embodiments can be used without departing from the scope of the present disclosure.

The procedure begins in 1401, a UE determines a number S1 number of slots as the unit for SL resource allocation. In 1402, the UE determines a SL resource pool based on S1. In 1403, the UE determines a number of N2 OFDM symbols for AGC in the S1 slots. In 1404, the UE determines a number of OFDM symbols for PSSCH/PSCCH transmission in the S1 slots. In 1405, the UE determines the content for transmission on the N2 symbols for AGC based on repetition of the symbols for PSSCH/PSCCH transmission. In 1406, the UE performs SL transmissions for the AGC and PSSCH/PSCCH.

In one embodiment with reference to FIG. 14, an example UE procedure for resource allocation for SL transmissions is shown.

This disclosure includes embodiments for supporting slot group based resource allocation for SL transmission and/or reception. More precisely, the following components are provided in this disclosure.

Figure 15:
FIG. 15 illustrates a diagram of an example PSSCH slot group according to embodiments of the present disclosure.
Figure 15:
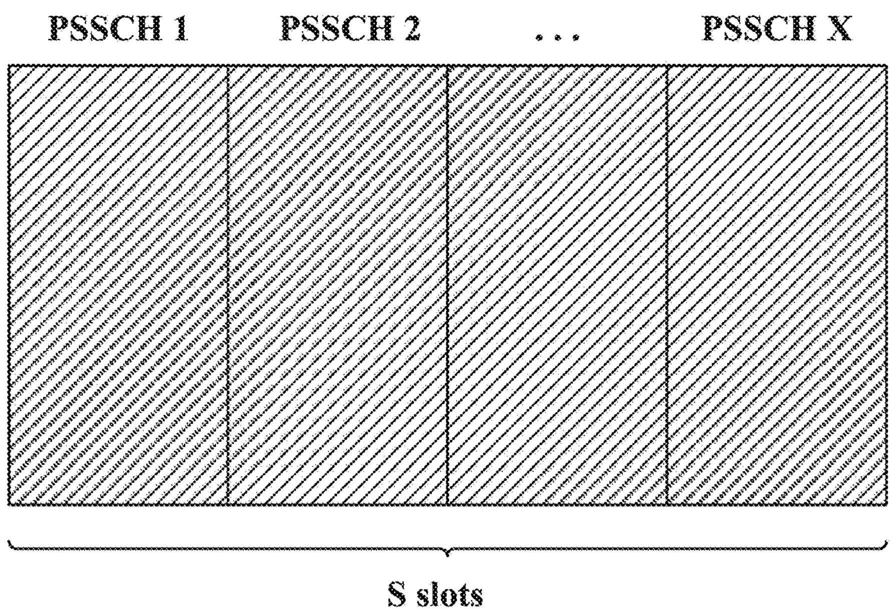

- Multiple PSSCH resource allocation in a slot group, including the slot group definition, the PSSCH allocation within the slot group, and the AGC issue for the PSSCH.
- PSCCH resource allocation in the slot group
- Second stage SCI resource allocation in the slot group
- PSFCH resource allocation within the slot group
- Resource allocation indication in the SCI for PSSCHs in the slot group
- Example UE procedure FIG. 15 illustrates a diagram of an example PSSCH slot group 1500 according to embodiments of the present disclosure. For example, PSSCH slot group 1500 can be utilized by the UE 111B of FIG. 1. This example is for illustration only and other embodiments can be used without departing from the scope of the present disclosure.

In one embodiment, the resources for a number X of PSSCHs can be allocated in a slot group, wherein the slot group includes a number S of consecutive slots. With reference to FIG. 15, an illustration of the embodiment is shown.

In one example, the slot groups are consecutive and non-overlapping.

In another example, the first slot group starts from the beginning of a subframe.

In one example, the value of S can be fixed. For one instance, S=1. For another instance, S=2.

In another example, the value of S can be fixed per a SCS, e.g., the SCS of the SL BWP or the SCS of the PSSCH. For one instance, S=1 for 120 kHz SCS. For another instance, S=2 for 240 kHz SCS. For yet another instance, S=4 for 480 kHz SCS. For yet another instance, S=8 for 960 kHz SCS. For yet another instance, S=4 for 960 kHz SCS.

In yet another example, the value of S can be determined based on a SCS, e.g., the SCS of the SL BWP or the SCS of the PSSCH, wherein the determination can be e.g., in the form of S=R*S', wherein R=SCS_PSSCH/SCS_ref, and SCS_PSSCH is the SCS of the SL BWP or PSSCH, and SCS_ref is the reference SCS. For one instance, SCS_ref=120 kHz. For another instance, S' can be fixed as 1. For yet another sub-instance, S' can be (pre-)configured.

In yet another example, the value of S can be (pre-) configured. For one instance, S can be 1 for 120 kHz SCS, and/or S can be 2 for 240 kHz SCS, and/or S can be 4 for 480 kHz SCS, and/or S can be 8 for 960 kHz SCS. For another instance, S can be 1 for 120 kHz SCS, and/or S can be 2 for 240 kHz SCS, and/or S can be 4 for 480 kHz SCS, and/or S can be 4 or 8 for 960 kHz SCS.

In yet another example, the value of S can be subject to a UE capability and reported by the UE (e.g., the UE 111).

In one example, the value of X can be fixed. For one instance, X=1. For another instance, X=2.

In another example, the value of X can be fixed per a SCS, e.g., the SCS of the SL BWP or the SCS of the PSSCH. For one instance, X=1 for 120 kHz SCS. For another instance, X=2 for 240 kHz SCS. For yet another instance, X=4 for 480 kHz SCS. For yet another instance, X=8 for 960 kHz SCS. For yet another instance, X=4 for 960 kHz SCS.

In yet another example, the value of X can be determined based on a SCS, e.g., the SCS of the SL BWP or the SCS of the PSSCH, wherein the determination can be e.g., in the form of X=R*X', wherein R=SCS_PSSCH/SCS_ref, and SCS_PSSCH is the SCS of the SL BWP or PSSCH, and SCS_ref is the reference SCS. For one instance, SCS_ref=120 kHz. For another instance, X' can be fixed as 1. For yet another sub-instance, X' can be (pre-) configured.

In yet another example, the value of X can be (pre-) configured. For one instance, X can be (pre-)configured from {1, 2, 4, 8} or its subset.

In yet another example, the value of X can be subject to a UE capability and reported by the UE.

In yet another example, X=S.

In one example, each PSSCH in the set of X PSSCHs is confined within a slot in the S slots, e.g., the PSSCH does not cross a slot boundary.

In another example, a PSSCH in the set of X PSSCHs can cross the slot boundary.

In yet another example, each PSSCH in the set of X PSSCHs occupy configured or indicated RBs in an OFDM symbol, and two PSSCHs in the set of X PSSCHs do not map to the same OFDM symbol.

Figure 16:
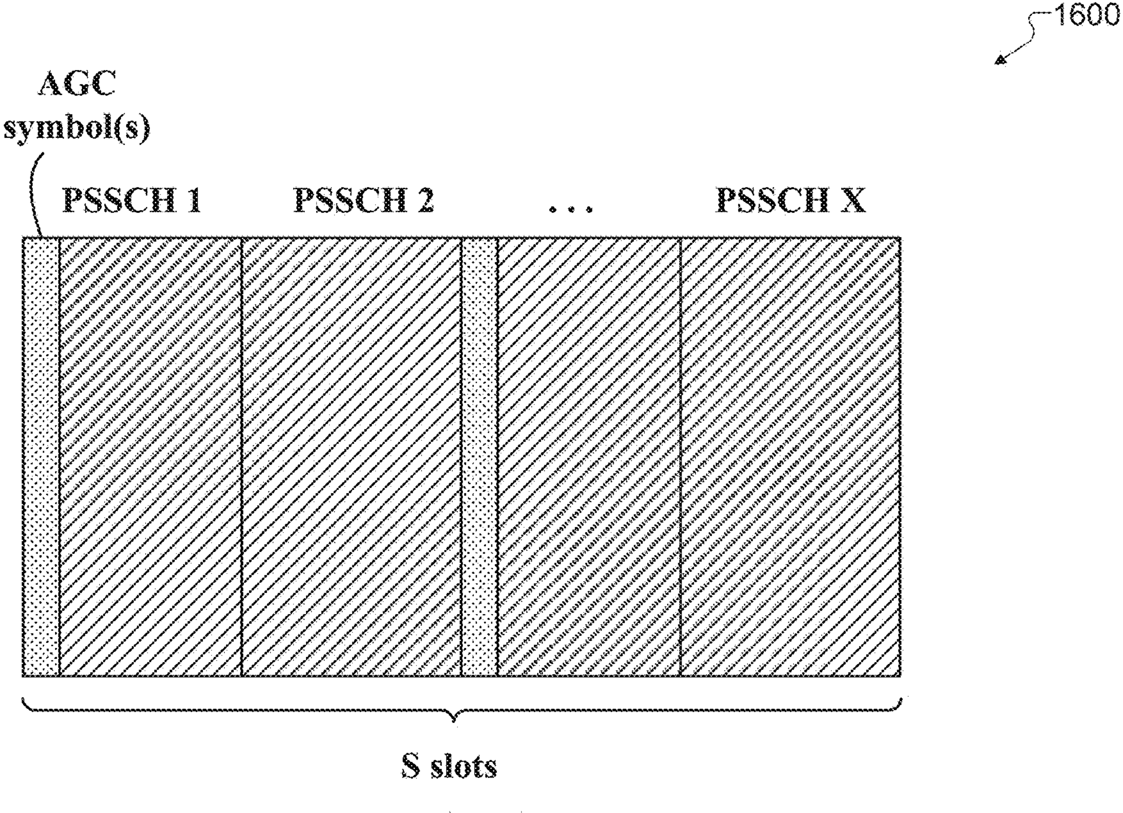
FIG. 16 illustrates a diagram of an example PSSCH slot group according to embodiments of the present disclosure.

FIG. 16 illustrates a diagram of an example PSSCH slot group 1600 according to embodiments of the present disclosure. For example, PSSCH slot group 1600 can be utilized by the UE 111C of FIG. 1. This example is for illustration only and other embodiments can be used without departing from the scope of the present disclosure.

In one example, at least one PSSCH in the set of X PSSCHs includes AGC symbol(s), wherein the AGC symbol(s) locate from the beginning of the PSSCH. With reference to FIG. 16, an illustration of the example is shown.

- For one sub-example, the at least one PSSCH includes the first PSSCH in the set of X PSSCHs.
- For another sub-example, the at least one PSSCH that includes the AGC symbol(s) can be indicated by a bitmap. One bit in the bitmap taking value of 1 indicates the corresponding PSSCH includes AGC symbol(s), and the one bit in the bitmap taking value of 0 indicates the corresponding PSSCH does not include AGC symbol(s).
  - For one instance, the bitmap is with length X, and each bit in the bitmap corresponds to a PSSCH in the set of X PSSCHs, respectively.
  - For another instance, the bitmap is with length X−1, and each bit in the bitmap corresponds to a PSSCH in the set of X PSSCHs other than the first PSSCH, respectively.
  - For yet another instance, the bitmap is with length X', wherein X' corresponds to a number of candidate PSSCH(s) that include the AGC symbol(s) (e.g., the X' PSSCHs are selected from the X PSSCHs, based on a fixed number, or based on a predefined rule, or based on a (pre-)configuration). Each bit in the bitmap corresponds to a candidate PSSCH in the set of X' PSSCHs, respectively.
  - For yet another instance, the bitmap is with length X−1, wherein X' corresponds to a number of candidate PSSCH(s) that include the AGC symbol(s) (e.g., the X' PSSCHs are selected from the X PSSCHs, based on a fixed number, or based on a predefined rule, or based on a (pre-)configuration). Each bit in the bitmap corresponds to a PSSCH in the set of X' PSSCHs other than the first PSSCH, respectively.
  - For one instance, the bitmap is with length S, and each bit in the bitmap corresponds to a slot in slot group, respectively.
  - For another instance, the bitmap is with length S−1, and each bit in the bitmap corresponds to a slot in slot group other than the first slot, respectively.
  - For yet another instance, the bitmap is with length S', wherein S' corresponds to a number of candidate slot(s) that include the AGC symbol(s) (e.g., the S' slots are selected from the S slots, based on a fixed number, or based on a predefined rule, or based on a (pre-)configuration). Each bit in the bitmap corresponds to a candidate slot in the set of S' slots, respectively.
  - For yet another instance, the bitmap is with length S'−1, wherein S' corresponds to a number of candidate slot(s) that include the AGC symbol(s) (e.g., the S' slots are selected from the S slots, based on a fixed number, or based on a predefined rule, or based on a (pre-)configuration). Each bit in the bitmap corresponds to a candidate slot in the set of S' slots other than the first slot, respectively.
  - For yet another instance, the indication based on the bitmap can be (pre-) configured.
  - For yet another instance, the indication based on the bitmap can be provided by a SCI (e.g., a first stage SCI included in a PSCCH and/or a second stage SCI included in a PSSCH). For one sub-instance, the SCI can be associated with the first PSSCH in the set of X PSSCHs or the first slot in the slot group.
- For yet another sub-example, when multiple PSSCHs include one PSSCH including AGC symbol(s) (e.g., the first PSSCH in the multiple PSSCHs includes the AGC symbol(s)), the multiple PSSCHs can have the same source ID and/or destination ID.

Figure 17:
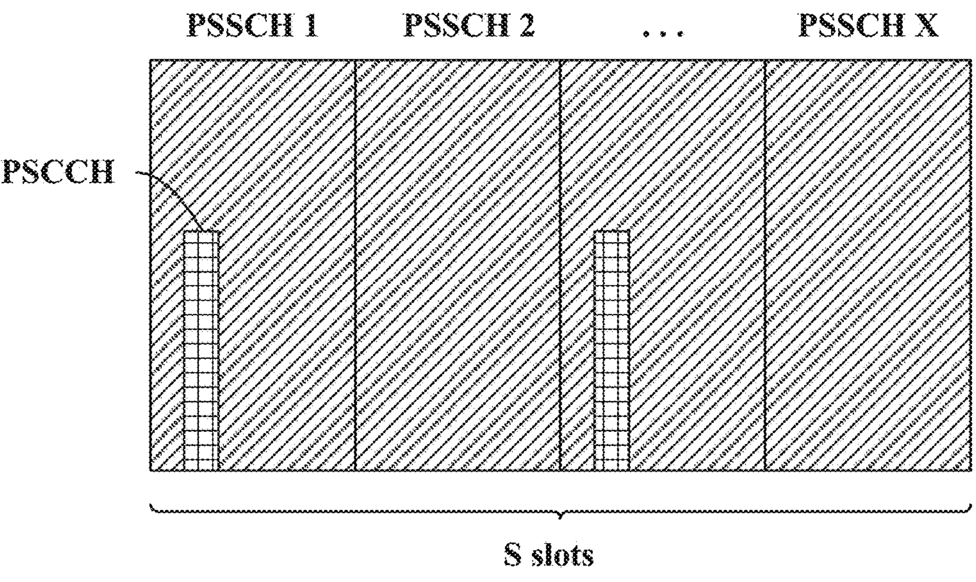
FIG. 17 illustrates a diagram of an example PSSCH slot group according to embodiments of the present disclosure.

FIG. 17 illustrates a diagram of an example PSSCH slot group 1700 according to embodiments of the present disclosure. For example, PSSCH slot group 1700 can be utilized by the UE 111A of FIG. 1. This example is for illustration only and other embodiments can be used without departing from the scope of the present disclosure.

In one embodiment, the resources for a number of PSCCHs can be allocated in a slot group, wherein the slot group includes a number S of consecutive slots. With reference to FIG. 17, an illustration of the embodiment is shown.

In one example, at least one PSSCH in the set of X PSSCHs includes PSCCH. With reference to FIG. 17, an illustration of the example is shown.

For one sub-example, the at least one PSSCH includes the first PSSCH in the set of X PSSCHs. For instance, the at least one PSSCH is the first PSSCH in the set of X PSSCHs.

For another sub-example, the at least one PSSCH that includes the PSCCH can be indicated by a bitmap. One bit in the bitmap taking value of 1 indicates the corresponding PSSCH includes PSCCH, and the one bit in the bitmap taking value of 0 indicates the corresponding PSSCH does not include PSCCH.

For one instance, the bitmap is with length X, and each bit in the bitmap corresponds to a PSSCH in the set of X PSSCHs, respectively.

For another instance, the bitmap is with length X−1, and each bit in the bitmap corresponds to a PSSCH in the set of X PSSCHs other than the first PSSCH, respectively.

For yet another instance, the bitmap is with length X', wherein X' corresponds to a number of candidate PSSCH(s) that include the PSCCH (e.g., the X' PSSCHs are selected from the X PSSCHs, based on a fixed number, or based on a predefined rule, or based on a (pre-)configuration). Each bit in the bitmap corresponds to a candidate PSSCH in the set of X' PSSCHs, respectively.

For yet another instance, the bitmap is with length X−1, wherein X' corresponds to a number of candidate PSSCH(s) that include the PSCCH (e.g., the X' PSSCHs are selected from the X PSSCHs, based on a fixed number, or based on a predefined rule, or based on a (pre-)configuration). Each bit in the bitmap corresponds to a PSSCH in the set of X' PSSCHs other than the first PSSCH, respectively.

For one instance, the bitmap is with length S, and each bit in the bitmap corresponds to a slot in slot group, respectively.

For another instance, the bitmap is with length S−1, and each bit in the bitmap corresponds to a slot in slot group other than the first slot, respectively.

For yet another instance, the bitmap is with length S', wherein S' corresponds to a number of candidate slot(s) that include the PSCCH (e.g., the S' slots are selected from the S slots, based on a fixed number, or based on a predefined rule, or based on a (pre-) configuration). Each bit in the bitmap corresponds to a candidate slot in the set of S' slots, respectively.

For yet another instance, the bitmap is with length S'−1, wherein S' corresponds to a number of candidate slot(s) that include the PSCCH (e.g., the S' slots are selected from the S slots, based on a fixed number, or based on a predefined rule, or based on a (pre-) configuration). Each bit in the bitmap corresponds to a candidate slot in the set of S' slots other than the first slot, respectively.

For yet another instance, the indication based on the bitmap can be (pre-) configured.

For yet another instance, the indication based on the bitmap can be provided by a SCI (e.g., a first stage SCI included in a PSCCH and/or a second stage SCI included in a PSSCH). For one sub-instance, the SCI can be associated with the first PSSCH in the set of X PSSCHs or the first slot in the slot group.

For yet another sub-example, when multiple PSSCHs include one PSSCH including PSCCH (e.g., the first PSSCH in the multiple PSSCHs includes the PSCCH), the multiple PSSCHs can have the same source ID and/or destination ID.

For yet another sub-example, the PSSCHs including the PSCCH are the same as the PSSCHs including the AGC symbol(s).

Figure 18:
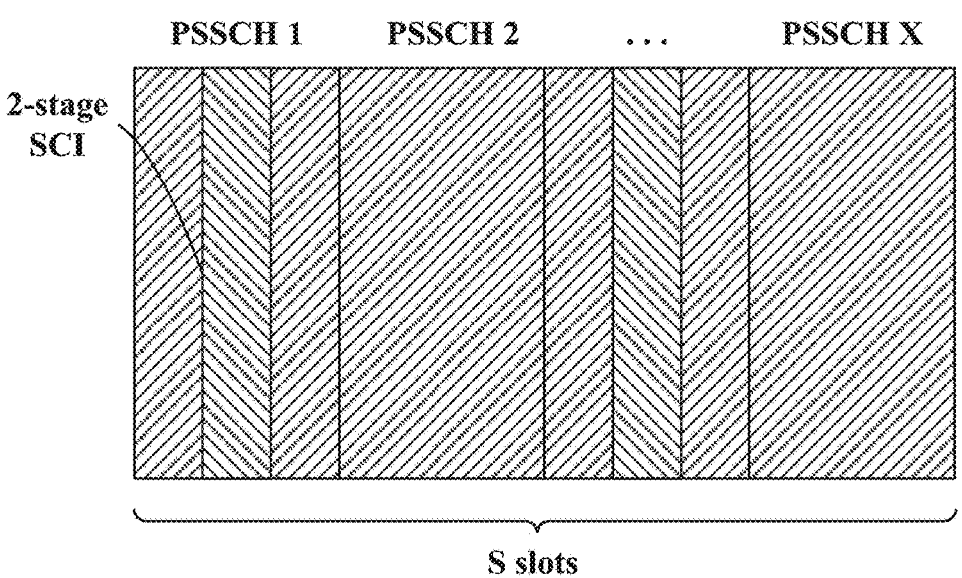
FIG. 18 illustrates a diagram of an example PSSCH slot group according to embodiments of the present disclosure.

FIG. 18 illustrates a diagram of an example PSSCH slot group 1800 according to embodiments of the present disclosure. For example, PSSCH slot group 1800 can be utilized by the UE 111B of FIG. 1. This example is for illustration only and other embodiments can be used without departing from the scope of the present disclosure.

In one embodiment, the resources for a number of second stage SCI (e.g., included in PSSCH) can be allocated in a slot group, wherein the slot group includes a number S of consecutive slots. With reference to FIG. 18, an illustration of the embodiment is shown.

In one example, at least one PSSCH in the set of X PSSCHs includes second stage SCI. With reference to FIG. 18, an illustration of the example is shown.

For one sub-example, the at least one PSSCH includes the first PSSCH in the set of X PSSCHs. For instance, the at least one PSSCH is the first PSSCH in the set of X PSSCHs.

For another sub-example, the at least one PSSCH that includes the second stage SCI can be indicated by a bitmap. One bit in the bitmap taking value of 1 indicates the corresponding PSSCH includes second stage SCI, and the one bit in the bitmap taking value of 0 indicates the corresponding PSSCH does not include second stage SCI.

For one instance, the bitmap is with length X, and each bit in the bitmap corresponds to a PSSCH in the set of X PSSCHs, respectively.

For another instance, the bitmap is with length X−1, and each bit in the bitmap corresponds to a PSSCH in the set of X PSSCHs other than the first PSSCH, respectively.

For yet another instance, the bitmap is with length X', wherein X' corresponds to a number of candidate PSSCH(s) that include the second stage SCI (e.g., the X' PSSCHs are selected from the X PSSCHs, based on a fixed number, or based on a predefined rule, or based on a (pre-)configuration). Each bit in the bitmap corresponds to a candidate PSSCH in the set of X' PSSCHs, respectively.

For yet another instance, the bitmap is with length X−1, wherein X' corresponds to a number of candidate PSSCH(s) that include the second stage SCI (e.g., the X' PSSCHs are selected from the X PSSCHs, based on a fixed number, or based on a predefined rule, or based on a (pre-)configuration). Each bit in the bitmap corresponds to a PSSCH in the set of X' PSSCHs other than the first PSSCH, respectively.

For one instance, the bitmap is with length S, and each bit in the bitmap corresponds to a slot in slot group, respectively.

For another instance, the bitmap is with length S−1, and each bit in the bitmap corresponds to a slot in slot group other than the first slot, respectively.

For yet another instance, the bitmap is with length S', wherein S' corresponds to a number of candidate slot(s) that include the second stage SCI (e.g., the S' slots are selected from the S slots, based on a fixed number, or based on a predefined rule, or based on a (pre-)configuration). Each bit in the bitmap corresponds to a candidate slot in the set of S' slots, respectively.

For yet another instance, the bitmap is with length S'−1, wherein S' corresponds to a number of candidate slot(s) that include the second stage SCI (e.g., the S' slots are selected from the S slots, based on a fixed number, or based on a predefined rule, or based on a (pre-)configuration). Each bit in the bitmap corresponds to a candidate slot in the set of S' slots other than the first slot, respectively.

For yet another instance, the indication based on the bitmap can be (pre-) configured.

For yet another instance, the indication based on the bitmap can be provided by a SCI (e.g., a first stage SCI included in PSCCH and/or a second stage SCI included in a PSSCH). For one sub-instance, the SCI can be associated with the first PSSCH in the set of X PSSCHs or the first slot in the slot group.

For yet another sub-example, when multiple PSSCHs include one PSSCH including second stage SCI (e.g., the first PSSCH in the multiple PSSCHs includes the second stage SCI), the multiple PSSCHs can have the same source ID and/or destination ID.

For yet another sub-example, the PSSCHs including the second stage SCI are the same as the PSSCHs including the AGC symbol(s).

For yet another sub-example, the PSSCHs including the second stage SCI are the same as the PSSCHs including the PSCCH.

In one embodiment, for a number Y of PSSCHs including PSCCH and/or second stage SCI, e.g., the first PSSCH within the Y PSCCHs includes PSCCH and/or second stage SCI, the first stage SCI included in the PSCCH and/or the second stage SCI includes the resource allocation indication for the Y PSSCHs.

In one example, the Y PSSCHs include the same transport block (TB), and the transmission of the Y PSSCHs are petition for the same TB.

In another example, each PSSCH in the Y PSSCHs includes a separate TB.

In one example, the time domain resource allocation for the Y PSSCHs within their corresponding slots are the same, e.g., a same starting symbol and/or a same length of symbols.

In another example, the time domain resource allocation for the Y PSSCHs within their corresponding slots may or may not be the same, and the starting symbol and length of symbols for each PSSCH can be jointly indicated in the first stage SCI and/or the second stage SCI.

Figure 19:
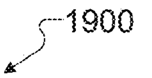
FIG. 19 illustrates a diagram of an example PSSCH slot group according to embodiments of the present disclosure.
Figure 19:
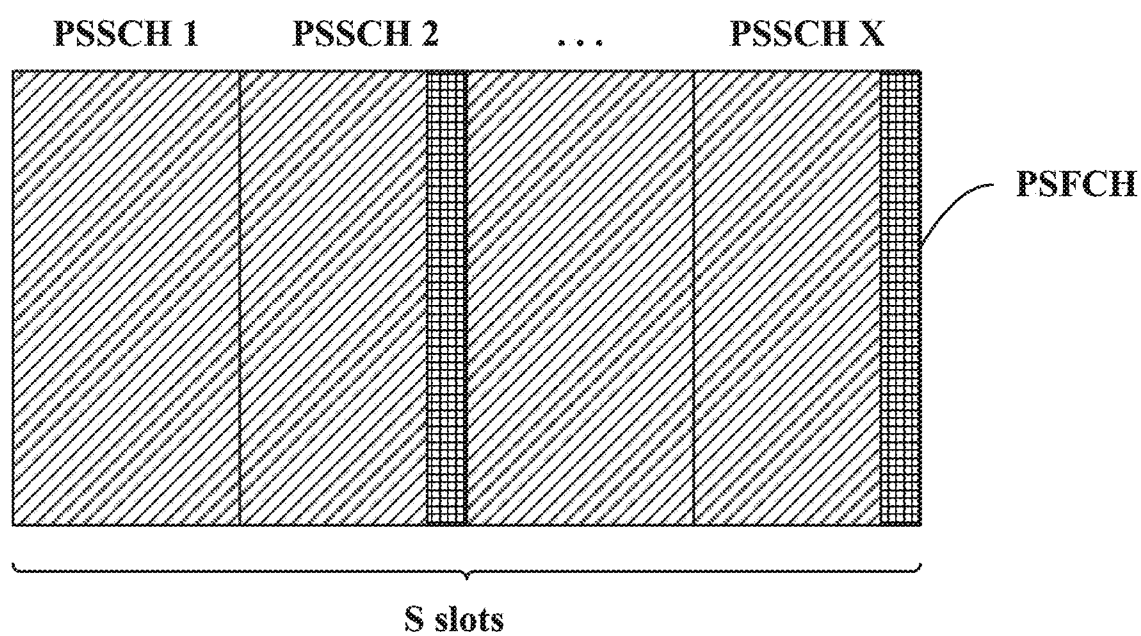

FIG. 19 illustrates a diagram of an example PSSCH slot group 1900 according to embodiments of the present disclosure. For example, PSSCH slot group 1900 can be utilized by the UE 111C of FIG. 1. This example is for illustration only and other embodiments can be used without departing from the scope of the present disclosure.

In one embodiment, the resources for a number of PSFCH(s) can be allocated in a slot group, wherein the slot group includes a number S of consecutive slots. With reference to FIG. 19, an illustration of the embodiment is shown.

In one example, at least one slots in the set of S slots includes PSFCH. With reference to FIG. 19, an illustration of the example is shown.

For one sub-example, the at least one slots include the last slot of the S slots. For instance, the at least one slots are the last slot of the S slots.

For another sub-example, the at least one slots that include the PSFCH can be indicated by a bitmap. One bit in the bitmap taking value of 1 indicates the corresponding slot includes PSFCH, and the one bit in the bitmap taking value of 0 indicates the corresponding slot does not include PSFCH.

For one instance, the bitmap is with length X, and each bit in the bitmap corresponds to a PSSCH in the set of X PSSCHs, respectively.

For another instance, the bitmap is with length X−1, and each bit in the bitmap corresponds to a PSSCH in the set of X PSSCHs other than the last PSSCH, respectively.

For yet another instance, the bitmap is with length X', wherein X' corresponds to a number of candidate PSSCH(s) that include the PSFCH (e.g., the X' PSSCHs are selected from the X PSSCHs, based on a fixed number, or based on a predefined rule, or based on a (pre-)configuration). Each bit in the bitmap corresponds to a candidate PSSCH in the set of X' PSSCHs, respectively.

For yet another instance, the bitmap is with length X−1, wherein X' corresponds to a number of candidate PSSCH(s) that include the PSFCH (e.g., the X' PSSCHs are selected from the X PSSCHs, based on a fixed number, or based on a predefined rule, or based on a (pre-)configuration). Each bit in the bitmap corresponds to a PSSCH in the set of X' PSSCHs other than the last PSSCH, respectively.

For one instance, the bitmap is with length S, and each bit in the bitmap corresponds to a slot in slot group, respectively.

For another instance, the bitmap is with length S−1, and each bit in the bitmap corresponds to a slot in slot group other than the last slot, respectively.

For yet another instance, the bitmap is with length S', wherein S' corresponds to a number of candidate slot(s) that include the PSFCH (e.g., the S' slots are selected from the S slots, based on a fixed number, or based on a predefined rule, or based on a (pre-) configuration). Each bit in the bitmap corresponds to a candidate slot in the set of S' slots, respectively.

For yet another instance, the bitmap is with length S'−1, wherein S' corresponds to a number of candidate slot(s) that include the PSFCH (e.g., the S' slots are selected from the S slots, based on a fixed number, or based on a predefined rule, or based on a (pre-) configuration). Each bit in the bitmap corresponds to a candidate slot in the set of S' slots other than the last slot, respectively.

For yet another instance, the indication based on the bitmap can be (pre-) configured.

For yet another instance, the indication based on the bitmap can be provided by a SCI (e.g., a first stage SCI included in a PSCCH and/or a second stage SCI included in a PSSCH). For one sub-instance, the SCI can be associated with the first PSSCH in the set of X PSSCHs or the first slot in the slot group.

For yet another sub-example, the PSSCHs including the PSFCH are the same as the PSSCHs including the AGC symbol(s).

For yet another sub-example, the PSSCHs including the PSFCH are the same as the PSSCHs including the PSCCH.

Figure 20:
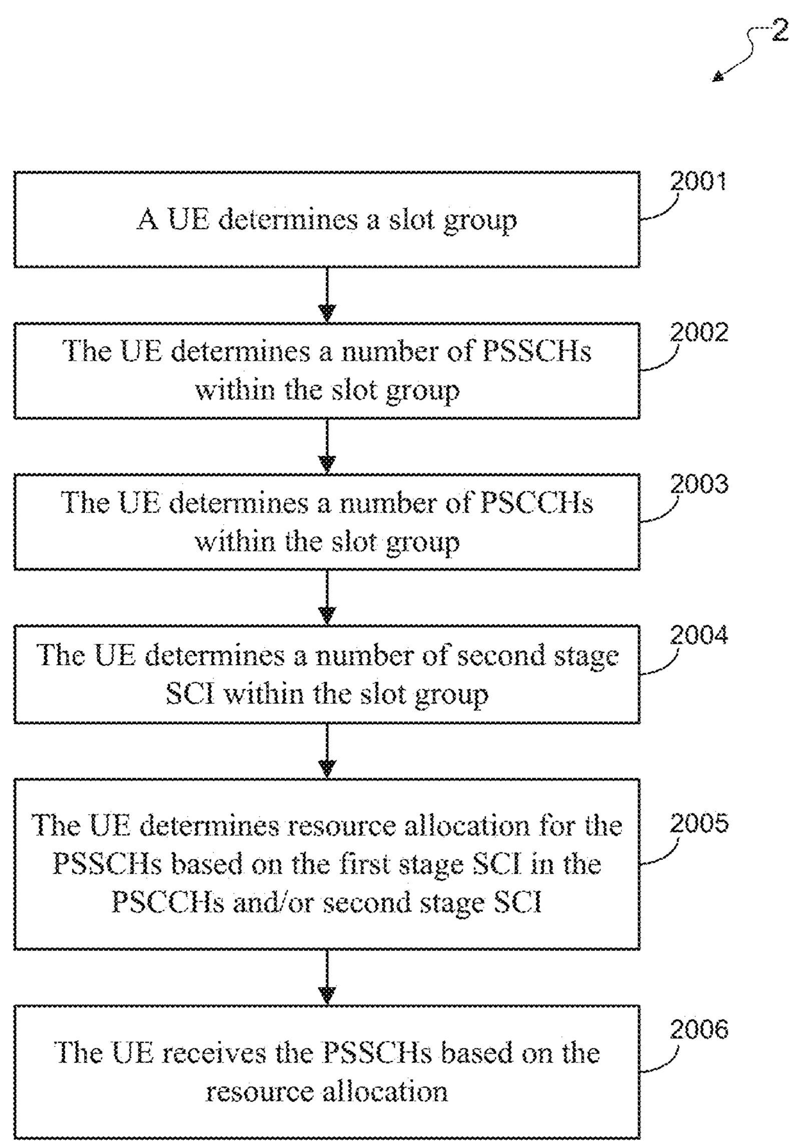
FIG. 20 illustrates a flowchart of an example UE procedure for resource allocation for PSSCH(s) according to embodiments of the present disclosure.

FIG. 20 illustrates a flowchart of an example UE procedure 2000 for resource allocation for PSSCH(s) according to embodiments of the present disclosure. For example, UE procedure 2000 for resource allocation for PSSCH(s) can be performed by the UE 111A of FIG. 1. This example is for illustration only and other embodiments can be used without departing from the scope of the present disclosure.

The procedure begins in 2001, a UE determines a slot group. In 2002, the UE determines a number of PSSCHs within the slot group. In 2003, the UE determines a number of PSCCHs within the slot group. In 2004, the UE determines a number of second stage SCI within the slot group. In 2005, the UE determines resource allocation for the PSSCHs based on the first stage SCI in the PSCCHs and/or second stage SCI. In 2006, the UE receives the PSSCHs based on the resource allocation.

In one embodiment, with reference to FIG. 20, an example UE procedure for supporting slot group based SL transmission and/or reception is shown.

The above flowchart(s) illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of the present disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A user equipment (UE) in a wireless communication system, the UE comprising:

a transceiver configured to receive higher layer parameters including a bitmap; and a processor operably coupled to the transceiver, the processor configured to:

determine a first number S>1;

determine a sidelink resource pool based on the bitmap and the first number S, wherein bits in the bitmap indicate whether a group of S consecutive slots are included in the sidelink resource pool;

determine a second number L; and determine L consecutive orthogonal frequency division multiplexing (OFDM) symbols within the S consecutive slots, wherein the L consecutive OFDM symbols are used for a physical sidelink shared channel (PSSCH) or a physical sidelink control channel (PSCCH), wherein the transceiver is further configured to receive the PSSCH or the PSCCH.

2. The UE of claim 1, wherein:

the first number S is based on (i) the higher layer parameters or (ii) a sub-carrier spacing (SCS) associated with the sidelink resource pool, wherein:

S=1 when the SCS is 120 kilohertz (kHz);

S=2 when the SCS is 240 kHz; or

S=4 when the SCS is 480 kHz.

3. The UE of claim 1, wherein:

the second number L is based on the higher layer parameters; and the processor is further configured to determine a starting location of the L consecutive OFDM symbols based on the higher layer parameters.

4. The UE of claim 1, wherein:

the processor is further configured to:

determine a third number N2, and determine N2 consecutive OFDM symbols within the L consecutive OFDM symbols;

the N2 consecutive OFDM symbols are first N2 consecutive OFDM symbols within the L consecutive OFDM symbols; and the N2 consecutive OFDM symbols are repeated from a first OFDM symbol after the N2 consecutive OFDM symbols and within the L consecutive OFDM symbols.

5. The UE of claim 4, wherein:

the third number N2 is based on (i) the higher layer parameters; or (ii) a sub-carrier spacing (SCS) associated with the sidelink resource pool, wherein:

N2=1 when the SCS is 120 kilohertz (kHz);

N2=2 when the SCS is 240 kHz; or

N2=4 when the SCS is 480 kHz.

6. The UE of claim 1, wherein:

the processor is further configured to:

determine a third number N3, and determine N3 consecutive OFDM symbols after the L consecutive OFDM symbols;

the N3 consecutive OFDM symbols are first N3 consecutive OFDM symbols after the L consecutive OFDM symbols;

the N3 consecutive OFDM symbols are within the S consecutive slots; and the N3 consecutive OFDM symbols are not available for a sidelink transmission or a sidelink reception.

7. The UE of claim 6, wherein:

the third number N3 is based on (i) the higher layer parameters; or (ii) a sub-carrier spacing (SCS) associated with the sidelink resource pool, wherein:

N3=1 when the SCS is 120 kilohertz (kHz);

N3=2 when the SCS is 240 kHz; or

N3=4 when the SCS is 480 kHz.

8. The UE of claim 1, wherein the processor is further configured to:

determine that the S consecutive slots include an occasion for a physical sidelink feedback channel (PSFCH);

determine a third number N4;

determine a fourth number N5;

determine a fifth number N6;

determine N5+N6 consecutive OFDM symbols within the L consecutive OFDM symbols, wherein:

the N5+N6 consecutive OFDM symbols are last N5+N6 consecutive OFDM symbols within the L consecutive OFDM symbols; and the N5 consecutive OFDM symbols are repeated from a first OFDM symbol of the N6 consecutive OFDM symbols;

determine N4 consecutive OFDM symbols before the N5+N6 consecutive OFDM symbols, wherein:

the N4 consecutive OFDM symbols are first N4 consecutive OFDM symbols before the N5+N6 consecutive OFDM symbols; and the N4 consecutive OFDM symbols are not available for a sidelink transmission or a sidelink reception; and determine the occasion for the PSFCH as the N5+N6 consecutive OFDM symbols.

9. The UE of claim 8, wherein:

the third number N4 is:

determined from the higher layer parameters; or determined based on a sub-carrier spacing (SCS) associated with the sidelink resource pool, wherein:

N4=1 when the SCS is 120 kilohertz (kHz);

N4=2 when the SCS is 240 kHz; or

N4=4 when the SCS is 480 kHz;

the fourth number N5 is:

determined from the higher layer parameters; or determined based on the SCS associated with the sidelink resource pool, wherein:

N5=1 when the SCS is 120 kilohertz (kHz);

N5=2 when the SCS is 240 kHz; or

N5=4 when the SCS is 480 kHz; and the fifth number N6 is:

determined as 1; or determined from the higher layer parameters.

10. The UE of claim 1, wherein:

the processor is further configured to:

determine a third number X; and determine X PSSCHs within the group of S consecutive slots; and the third number X is:

determined as X=S; or determined from the higher layer parameters.

11. A method of a user equipment (UE) in a wireless communication system, the method comprising:

receiving higher layer parameters including a bitmap;

determining a first number S>1;

determining a sidelink resource pool based on the bitmap and the first number S, wherein bits in the bitmap indicate whether a group of S consecutive slots are included in the sidelink resource pool;

determining a second number L;

determining L consecutive orthogonal frequency division multiplexing (OFDM) symbols within the S consecutive slots, wherein the L consecutive OFDM symbols are used for a physical sidelink shared channel (PSSCH) or a physical sidelink control channel (PSCCH); and receiving the PSSCH or the PSCCH.

12. The method of claim 11, wherein:

the first number S is based on (i) the higher layer parameters or (ii) a sub-carrier spacing (SCS) associated with the sidelink resource pool, wherein:

S=1 when the SCS is 120 kilohertz (kHz);

S=2 when the SCS is 240 kHz; or

S=4 when the SCS is 480 kHz.

13. The method of claim 11 further comprising:

determining a starting location of the L consecutive OFDM symbols based on the higher layer parameters, wherein the second number L is based on the higher layer parameters.

14. The method of claim 11 further comprising:

determining a third number N2; and determining N2 consecutive OFDM symbols within the L consecutive OFDM symbols, wherein:

the N2 consecutive OFDM symbols are first N2 consecutive OFDM symbols within the L consecutive OFDM symbols; and the N2 consecutive OFDM symbols are repeated from a first OFDM symbol after the N2 consecutive OFDM symbols and within the L consecutive OFDM symbols.

15. The method of claim 14, wherein:

the third number N2 is based on (i) the higher layer parameters; or (ii) a sub-carrier spacing (SCS) associated with the sidelink resource pool, wherein:

N2=1 when the SCS is 120 kilohertz (kHz);

N2=2 when the SCS is 240 kHz; or

N2=4 when the SCS is 480 kHz.

16. The method of claim 11 further compromising:

determining a third number N3; and determining N3 consecutive OFDM symbols after the L consecutive OFDM symbols, wherein:

the N3 consecutive OFDM symbols are first N3 consecutive OFDM symbols after the L consecutive OFDM symbols;

the N3 consecutive OFDM symbols are within the S consecutive slots; and the N3 consecutive OFDM symbols are not available for a sidelink transmission or a sidelink reception.

17. The method of claim 16, wherein:

the third number N3 is based on (i) the higher layer parameters; or (ii) a sub-carrier spacing (SCS) associated with the sidelink resource pool, wherein:

N3=1 when the SCS is 120 kilohertz (kHz);

N3=2 when the SCS is 240 kHz; or

N3=4 when the SCS is 480 kHz.

18. The method of claim 11 further comprising:

determining that the S consecutive slots include an occasion for a physical sidelink feedback channel (PSFCH);

determining a third number N4;

determining a fourth number N5;

determining a fifth number N6;

determining N5+N6 consecutive OFDM symbols within the L consecutive OFDM symbols, wherein:

the N5+N6 consecutive OFDM symbols are last N5+N6 consecutive OFDM symbols within the L consecutive OFDM symbols; and the N5 consecutive OFDM symbols are repeated from a first OFDM symbol of the N6 consecutive OFDM symbols;

determining N4 consecutive OFDM symbols before the N5+N6 consecutive OFDM symbols, wherein:

the N4 consecutive OFDM symbols are first N4 consecutive OFDM symbols before the N5+N6 consecutive OFDM symbols; and the N4 consecutive OFDM symbols are not available for a sidelink transmission or a sidelink reception; and determining the occasion for the PSFCH as the N5+N6 consecutive OFDM symbols.

19. The method of claim 18, wherein the third number N4 is:

determined from the higher layer parameters; or determined based on a sub-carrier spacing (SCS) associated with the sidelink resource pool, wherein:

N4=1 when the SCS is 120 kilohertz (kHz);

N4=2 when the SCS is 240 kHz; or

N4=4 when the SCS is 480 kHz;

the fourth number N5 is:

determined from the higher layer parameters; or determined based on the SCS associated with the sidelink resource pool, wherein:

N5=1 when the SCS is 120 kilohertz (kHz);

N5=2 when the SCS is 240 kHz; or

N5=4 when the SCS is 480 kHz; and the fifth number N6 is:

determined as 1; or determined from the higher layer parameters.

20. The method of claim 11 further comprising:

determining a third number X; and determining X PSSCHs within the group of S consecutive slots, wherein the third number X is:

determined as X=S; or determined from the higher layer parameters.

* * * * *